(12) United States Patent
Natali, Jr. et al.

(10) Patent No.: US 12,493,395 B2
(45) Date of Patent: Dec. 9, 2025

(54) METHOD AND SYSTEM FOR PRESENTING AN INTERACTIVE MAP DISPLAY

(71) Applicant: Troutwood, LLC, Pittsburgh, PA (US)

(72) Inventors: Eugene M. Natali, Jr., Pittsburgh, PA (US); Jeffrey Richard Davidek, Pittsburgh, PA (US); Dorian Brown, Pittsburgh, PA (US); Brian G. Taylor, Chicago, IL (US)

(73) Assignee: Troutwood Inc., Pittsburgh, PA (US)

( * ) Notice: Subject to any disclaimer, the term of this patent is extended or adjusted under 35 U.S.C. 154(b) by 0 days.

(21) Appl. No.: 17/380,760

(22) Filed: Jul. 20, 2021

(65) Prior Publication Data

US 2022/0019337 A1 Jan. 20, 2022

Related U.S. Application Data

(60) Provisional application No. 63/053,914, filed on Jul. 20, 2020.

(51) Int. Cl.
  *G06F 3/04817* (2022.01)
  *G01C 21/36* (2006.01)
  (Continued)

(52) U.S. Cl.
  CPC ..... *G06F 3/04817* (2013.01); *G01C 21/3667* (2013.01); *G06F 3/0482* (2013.01); *G06F 3/0484* (2013.01)

(58) Field of Classification Search
  CPC .. G06F 3/04817; G06F 3/0482; G06F 3/0484; G06F 16/26; G06F 16/29;
  (Continued)

(56) References Cited

U.S. PATENT DOCUMENTS

| | | | | |
|---|---|---|---|---|
| 6,583,794 B1 * | 6/2003 | Wattenberg | ............ | G06Q 40/06 715/708 |
| 6,606,525 B1 * | 8/2003 | Muthuswamy | ........ | G05B 15/02 709/201 |

(Continued)

FOREIGN PATENT DOCUMENTS

| WO | 2011020101 A2 | 2/2011 |
|---|---|---|
| WO | 2012162399 A2 | 11/2012 |
| WO | 2018201104 A1 | 11/2018 |

OTHER PUBLICATIONS

PCT Search Report and Written Opinion for international application PCT/US2021/070912, 14 pages, dated Oct. 26, 2021.

(Continued)

*Primary Examiner* — Asher D Kells
(74) *Attorney, Agent, or Firm* — Barley Snyder

(57) ABSTRACT

An interactive map display is provided. The interactive map display has at least one computer processing unit element including a general user interface, a server having a plurality of modules, including: a map display module displaying an interactive map on the general user interface; an icon display module displaying a plurality of icons representing a plurality of entities of a common grouping and positioned within the interactive map, each icon of the plurality of icons is indicative of a single entity of plurality of entities and has a primary icon element displaying static information and includes location and categorial data about the single entity; and a secondary icon element displaying dynamic information through a visual depiction of changing data values relating to the single entity and in contrast to the plurality of entities; and a select module that allows a user to select one of the plurality of icons.

15 Claims, 22 Drawing Sheets

(51) Int. Cl.
  *G06F 3/0482* (2013.01)
  *G06F 3/0484* (2022.01)
(58) Field of Classification Search
  CPC .... G06F 16/444; G06F 16/904; G06F 16/287;
     G06F 16/34; G06F 16/358; G06F 16/44;
     G06F 16/54; G06F 16/64; G06F 16/74;
     G01C 21/3667; G06Q 40/00–128; G06Q
     30/0205; G06T 17/05
  See application file for complete search history.

(56) References Cited

U.S. PATENT DOCUMENTS

| | | | | |
|---|---|---|---|---|
| 9,613,086 | B1* | 4/2017 | Sherman | G06F 16/248 |
| 10,042,524 | B2* | 8/2018 | Bogomolov | G06F 3/04817 |
| 10,474,339 | B2* | 11/2019 | Dayan | G06F 16/248 |
| 10,896,234 | B2* | 1/2021 | Takahashi | G06F 16/338 |
| 11,782,588 | B1* | 10/2023 | Bachmann | G06F 3/04842 |
| | | | | 702/5 |
| 2001/0030667 | A1 | 10/2001 | Kelts | |
| 2009/0319891 | A1* | 12/2009 | MacKinlay | G06F 3/04817 |
| | | | | 715/275 |
| 2012/0094639 | A1* | 4/2012 | Carlson | H04L 67/306 |
| | | | | 455/414.1 |
| 2012/0287162 | A1* | 11/2012 | Aminian | G06F 3/0485 |
| | | | | 345/660 |
| 2013/0110603 | A1* | 5/2013 | Chi | G06Q 20/3224 |
| | | | | 705/14.23 |
| 2013/0246934 | A1* | 9/2013 | Wade | G06F 3/04842 |
| | | | | 715/745 |
| 2014/0026088 | A1* | 1/2014 | Monte | G06F 3/0488 |
| | | | | 715/765 |
| 2015/0116351 | A1* | 4/2015 | Palkowsky | G06F 16/29 |
| | | | | 345/629 |
| 2016/0379311 | A1* | 12/2016 | Luoma | G06F 16/29 |
| | | | | 705/30 |
| 2017/0052655 | A1* | 2/2017 | Cervelli | G06F 3/04847 |
| 2017/0098318 | A1* | 4/2017 | Iannaccone | G06F 3/0482 |
| 2017/0228899 | A1* | 8/2017 | Witriol | G06T 11/001 |
| 2017/0270082 | A1* | 9/2017 | Marshall | G06T 11/206 |
| 2018/0005339 | A1* | 1/2018 | Jaycobs | G06Q 50/34 |
| 2019/0303451 | A1* | 10/2019 | Takahashi | G06F 16/29 |
| 2022/0269397 | A1* | 8/2022 | Clark | G06Q 40/08 |

OTHER PUBLICATIONS

PCT Notification, International Preliminary Report on Patentability, International application No. PCT/US2021/070912, 9 pages, dated Feb. 2, 2023.

MegaLexica, Computer Dictionary of Information Technology, "module", 1 page, downloaded Feb. 25, 2025.

* cited by examiner

METHOD AND SYSTEM FOR PRESENTING AN INTERACTIVE MAP DISPLAY

CROSS-REFERENCE TO RELATED APPLICATION

This application claims the benefit of U.S. Provisional Patent Application No. 63/053,914, filed on Jul. 20, 2020

FIELD OF THE INVENTION

This disclosure relates to a method and system of displaying highly variable information associated with one or more entities on an interactive digitally rendered map. In an aspect, the invention relates to a method and system of providing financial and investment education information and, more particularly, to a method and system of providing a map displaying the locations and attributes of objects or entities that are the subject of financial and investment education information.

BACKGROUND

Investors have utilized a variety of manners to access and review financial performance information, such as stock market updates presented in text form. Historically, such stock market performance information was distributed by telegraph and presented in print form on ticker tape, printed on a stock ticker. Market performance is presented in journals, and newspapers. Non-printed formats for reviewing market performance data include broadcast media, such as broadcast reports over radio, or presentations on television programming, often utilizing scrolling electronic displays reminiscent of ticker tape on financial television programming. There remains an ongoing need to disseminate financial performance data efficiently, as may be useful to ensure investors have accurate and timely information.

Digitally presented interactive maps, such as google maps, provide internet accessible, information on graphically displayed maps. The interactive maps may present information such as roadways, population centers, and terrain features, as is common on printed maps, but digital interactive maps may also display information that is more fluid or time-sensitive, and thus needing more frequent updates, in some instances, in near-real time. For example, google maps utilizes a system to obtain roadway traffic data, which may be reflected in near real-time as coloration applied to roadways. The information provided via the interactive map may be updated frequently, with the access to the latest information through data accessed through the internet. Additionally, within the digitally presented interactive map, a user may select an icon on the interactive map display, where selection of the icon brings up relevant information relevant to the selected location, such as hours of operation, summary of the business, menu, reviews, and associated images.

The icon depiction itself on the display may provide characteristic information about the nature of the represented item. For example, the icon may be provided in a color, representing the category represented by the icon, for example, medical services, restaurants, business and recreational facilities are each depicted in different colors. Furthermore, the icon may contain a representative image to indicate the nature of the facility with more specificity, for example, golf club may have a coloration of the icon indicating recreational facility, and further the icon may include a small depiction of a figure holding a golf club mid-swing; a restaurant icon with eating utensils depicted may be colored to represent business; or a grocery store may be of a selected color, and depict a shopping cart.

However, detailed information for each icon, which by its nature may beneficially be regularly updated, can only be seen selecting each icon to access detailed information, one icon at a time. What is needed is an interactive map presented in digital form and accessible on a computer device, that provides information about the depicted region of the interactive map, and further, the one or more icons included on the display may provide an indication of an attribute or performance of the represented item using real time data; where each of the icons in the display not only indicates the location, and category of the represented element, but the icon further provides a depiction representative of the near real time data associated with the particular element. In this manner, each of the icons visible on the display screen may also provide an indication of the characteristic or attribute in real time on the screen. Such an interactive map allows the user to search and review rapidly changed or unpredictably updated information, for example, financial information, for a plurality of entities displayed on the interactive map simultaneously.

What is further needed is a map capable of depicting icons, where each icon displays an infrequently updated information set, and an aspect of the icon may display real-time or frequently updated information that is regularly varying.

SUMMARY

Accordingly, an interactive map display system is provided. In an exemplary embodiment, the interactive map display has:
  at least one computer processing unit element including a general user interface,
  a server having a plurality of modules, including:
  a map display module displaying an interactive map on the general user interface;
  an icon display module displaying a plurality of icons representing a plurality of entities of a common grouping and positioned within the interactive map, each icon of the plurality of icons is indicative of a single entity of plurality of entities and includes:
    a primary icon element displaying static information and includes location and categorial data about the single entity; and
    a secondary icon element displaying dynamic information through a visual depiction of changing data values relating to the single entity and in contrast to the plurality of entities; and
  a select module that allows a user to select one of the plurality of icons.

In an exemplary embodiment, the common grouping is a class, league, division, market, business sector or team. In an embodiment, the primary icon element includes an identifier name displayed on the interactive map, and may further includes a marking to indicate a sector of the common grouping. In an embodiment, the map display system may provide a key panel for interpreting the marking by color or shape.

In an exemplary embodiment of the interactive map display system, the secondary icon element includes a visualization metric representing frequently updated data of changing values and changing on a periodic basis. In an embodiment, the secondary icon element includes a bubble data visualization positioned around the primary icon element. The secondary icon element may further provide a visualization metric based on data values associated with a user selected parameter. In an exemplary embodiment, the visualization metric is a bubble metric representing a changing financial data. In an exemplary embodiment of the interactive map display, the icon display module varies the size of the secondary icon element based on comparative data value of the plurality of entities. In an embodiment, the secondary icon element may be a disk surrounding the primary icon element and provides an indication of the direction and magnitude of change of the data value associated with the primary icon element; and optionally, the size of the disk of the secondary icon element indicates the magnitude of change and a color indicates the direction of the change.

In an exemplary embodiment, the interactive map display system further has a hover module triggered by placement of a cursor over a selected icon of the plurality of icons and displaying an additional panel with expanded data relevant to the selected icon.

In an exemplary embodiment, the interactive map display system further has a selection module having a selectable button displayed following selection of a selected icon of the plurality of icons and permitting a financial transaction related to the selected entity.

In an exemplary embodiment, the interactive map display system further has a search panel for entry of a search string and displaying a list of results.

In an exemplary embodiment, the interactive map display system further has a zoom module providing adjustment of a map scale and adjustment to a center of the interactive map.

In an exemplary embodiment, the interactive map display system further displays a plurality of ancillary icons unrelated to the plurality of primary icons and secondary icons.

BRIEF DESCRIPTION OF THE DRAWINGS

The invention will now be described by way of example with reference to the accompanying figures of which:

FIG. 13 is a screen shot of the user interface depicting an exemplary fact sheet for the icon selected in FIG. 12;

FIG. 15 is a screen shot of the user interface depicting an exemplary fact sheet for the icon selected in FIG. 14;

DETAILED DESCRIPTION OF THE EMBODIMENT(S)

Figure 1:
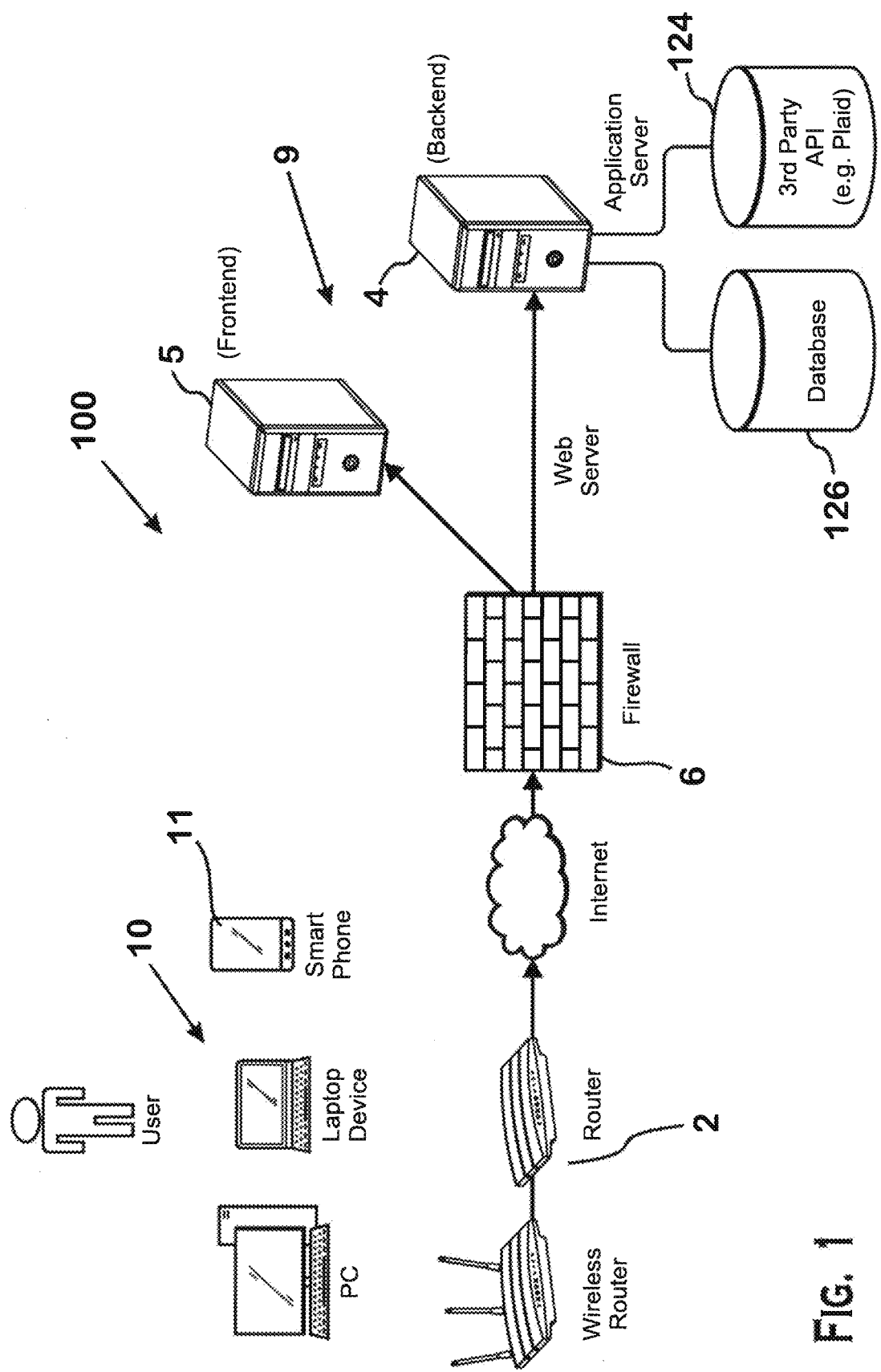
FIG. 1 is a schematic diagram of hardware infrastructure for an interactive map display system according to an embodiment of the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Other systems, methods, features, and advantages of the invention will be or will become apparent to one with skill in the art upon examination of the following figures and detailed description.

Hardware infrastructure for an exemplary embodiment of an interactive map display system 100 according to the invention will be described. In the embodiment shown in FIG. 1, the hardware infrastructure has a system architecture depicted with reference to FIG. 1, the system 100 is built on one or more network routers 2 (for instance, a wireless router) and connected to a web server 5 (the front end of the system, as will be discussed), and/or a database application server 4 (the back end of the system, as will be discussed), each having access to one or more data files. The system 100 also utilizes known hardware components, including, a firewall 6, a network 9, and the computing device 10 of the user. It is contemplated that, in an embodiment where the user's computing device is a terminal such as a PC or laptop, for example, the computing device 10 may be directly connected by network communication cable to the router 2, and the wireless router depicted may not be necessary. More commonly, the user end of the network 9 is provided with a computing device 10 that is a laptop, PC, tablet, or smart phone that can communicate wirelessly, and access the internet through a wireless communication system, such as a wireless router, that may connect directly to the internet, or be directed through a network router 2 in order to access the internet, as shown in FIG. 1. In an embodiment, the computing device 10 may be a tablet computer or smart phone with a touchscreen display 11. The touchscreen display 11 may use finger or stylus gestures to navigate the general user interface (GUI) provided on the screen by the software. However, one skilled in the art should appreciate that other implements could be used; including a computer mouse, a keyboard, or joystick. In fact, one skilled in the art should appreciate that the computing device 10 may be a physical computer and could be, but not limited to, a desktop computer, a laptop computer, or a cell phone, and utilize a downloaded app or web browser. The computing device 10 is to be provided with a memory device that is a storage device having computer components and recording media used to retain digital data. The processor of the computing device is a central processing unit (CPU) that manipulates data stored in the memory device by performing computations. The interaction and communications between the graphical user interface and the display visible to the user (the front end) and the interactions with the database, or other information as needed for preparing the icon elements (the back end) on the interactive map 200 are depicted in the simplified schematic of FIGS. 2 and 3.

The interactive map display system 100 allows a user to access a plurality of user options through the computing device 10 and a network traffic information on the database application server 4 (i.e., SQLServer or PostgreSQL (also known as Postgres) or newer) that connects to a web server 5 (i.e., SQLServer or PostgreSQL (also known as Postgres) or newer). The web server 5 functions as a way for the network router 2 to facilitate interaction between the computing device 10 and the application or program on the web server 5. The network router 2 similarly facilitates interaction between the computing device 10 and the application server 4 and the web server in order to access electronic files in the form of one or more databases, using an application-programming interface (API) for communications between the computing device 10 and the database of the database application server 4. In an embodiment, the application database server 4 may house a data aggregator API that can connect, using techniques known to those skilled in the art, to one of a database file or a third party API, to obtain frequently updated information relevant to the subject matter of an interactive map display. In an embodiment, the data aggregator may access a database file containing information relevant to financial or stock market information, or alternatively to regularly updated statistical information related to sports teams and players, as non-limiting examples.

In an embodiment, a firewall 6 may be integrated for security purposes such as, but not limited to, blocking unauthorized access to the web server 5 and the resulting unauthorized communication thereto. The interactive map display system 100 is designed to run through the computing device 10 utilizing the files for the application or program that are preferably loaded onto the user's computing device 10, such as into the memory of the computing device, and supplemented with information communicated through the network as will be discussed. It is contemplated that, alternatively, the files may be downloaded through the network 9 from the web server 5. The interactive map display system 100 is designed to run through the computing device 10, and through a plurality of modules utilized in the interactive map display system 100 that may be downloaded and function over any suitable network system 9, including personal area networks (PANs), local area networks (LANs), campus area networks (CANs), wide area networks (WANs), metropolitan area networks (MANs) and any new networking system developed in the future. In an embodiment, network 9 may be a set of hardware, software, and protocols that is configured for electronic communication. For example, network 9 may be any one of a global data network (e.g., the Internet), a regional data network, mobile/cellular wireless network, or a local area network. In a preferred embodiment, the network 9 represents a packet-switched network for routing various data. The network uses common high-level protocols, such as TCP/IP and may comprise multiple networks of differing protocols connected through appropriate gateways.

Figure 2:
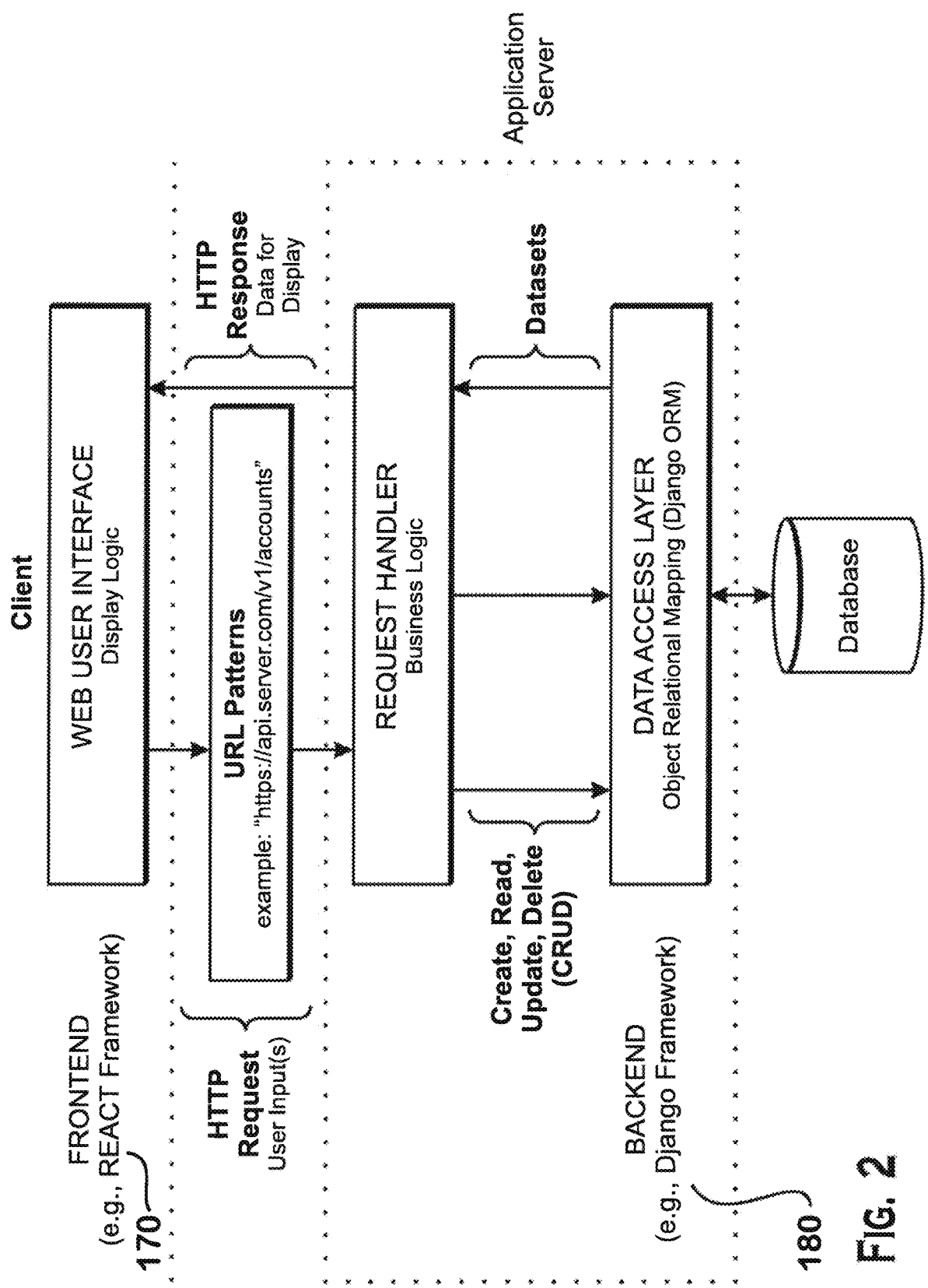
FIG. 2 is a schematic diagram of hardware infrastructure for front end and back end framework of an interactive map display system according to an embodiment of the invention.
Figure 3:
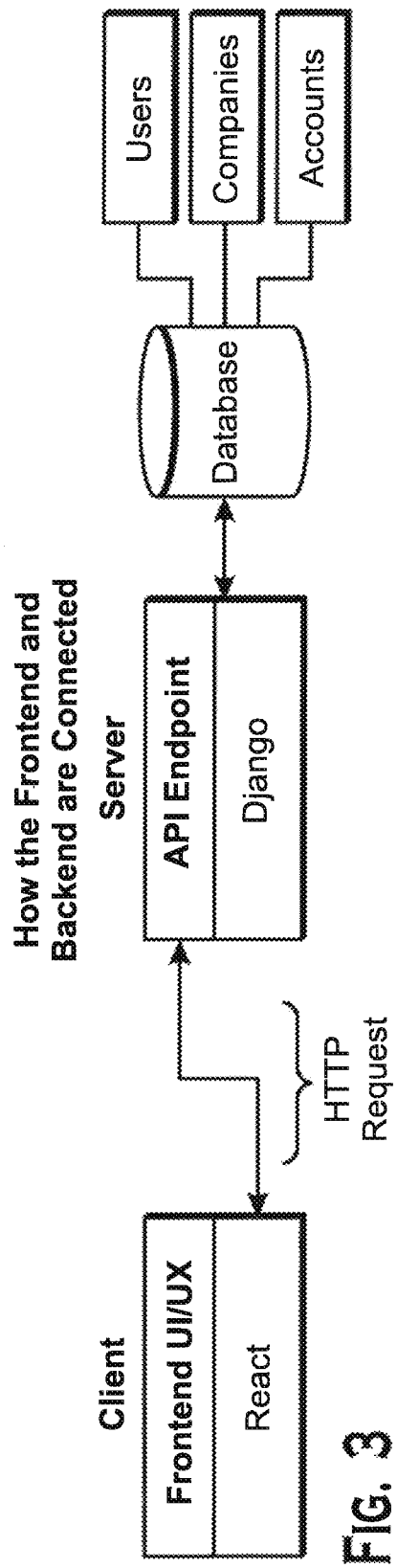
FIG. 3 is a schematic diagram of exemplary connection between a front end and a back end framework of an interactive map display system according to an embodiment of the invention.
Figure 4:
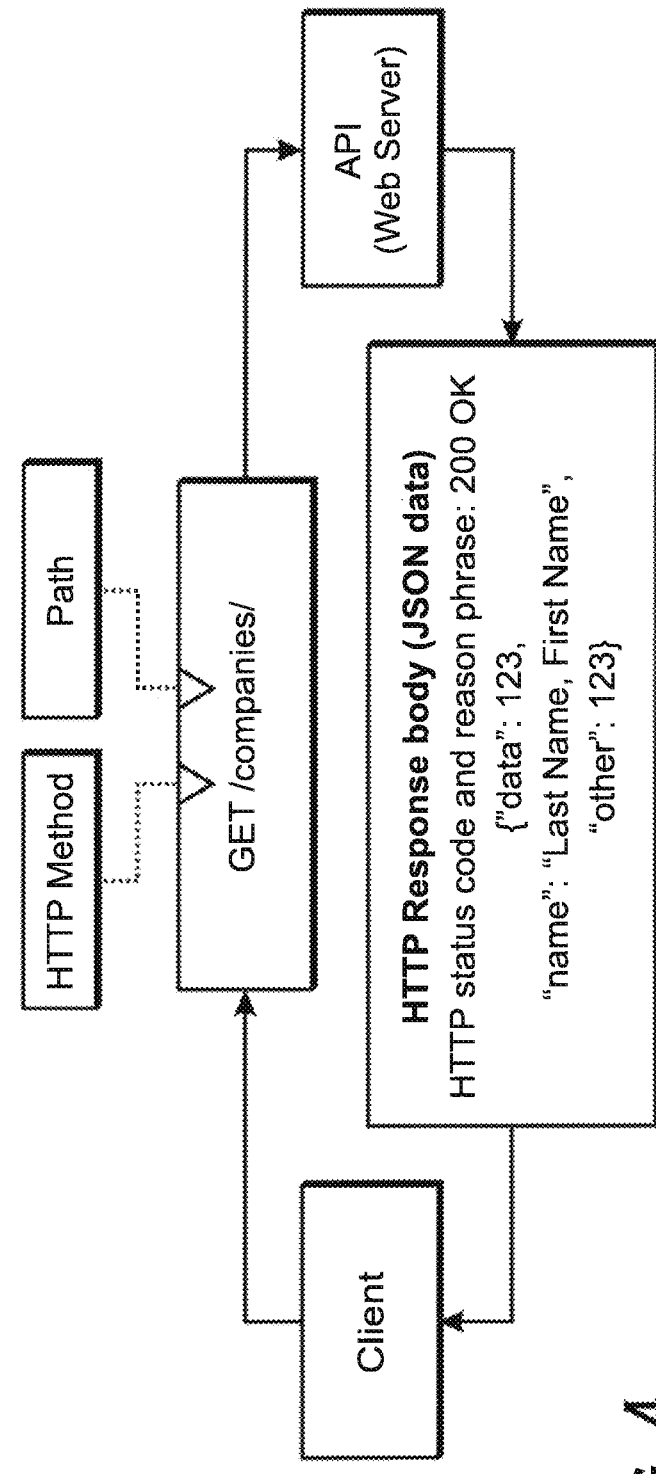
FIG. 4 is a schematic diagram of exemplary protocol between a front end and a back end framework of an interactive map display system according to an embodiment of the invention.

One skilled in the art should appreciate that the interactive map display system 100 can be maintained solely through the computing device 10, as the electronic files, such as map information and primary icon element 202a information can be pre-loaded to the computing device 10. In such an instance, the user may provide details regarding the current information for the secondary icon elements 202b, thereby avoid the need to have the computing device 10 access a third party databases or API to update the account information via network 9. In the shown embodiment, however, the computing device 10 for the user may connect to the network router 2, optionally using a wireless router, and update the information for the display 11 through the network 9. FIG. 2 illustrates an exemplary embodiment of the front end and back end framework of the interactive map display system 100. FIGS. 3 and 4 also provide exemplary architecture and protocol for the interactive map display system 100. Though one skilled in the art would appreciate that other hardware and protocol designs are possible as long as such modifications would not divert from the spirit of the invention.

Figure 5:
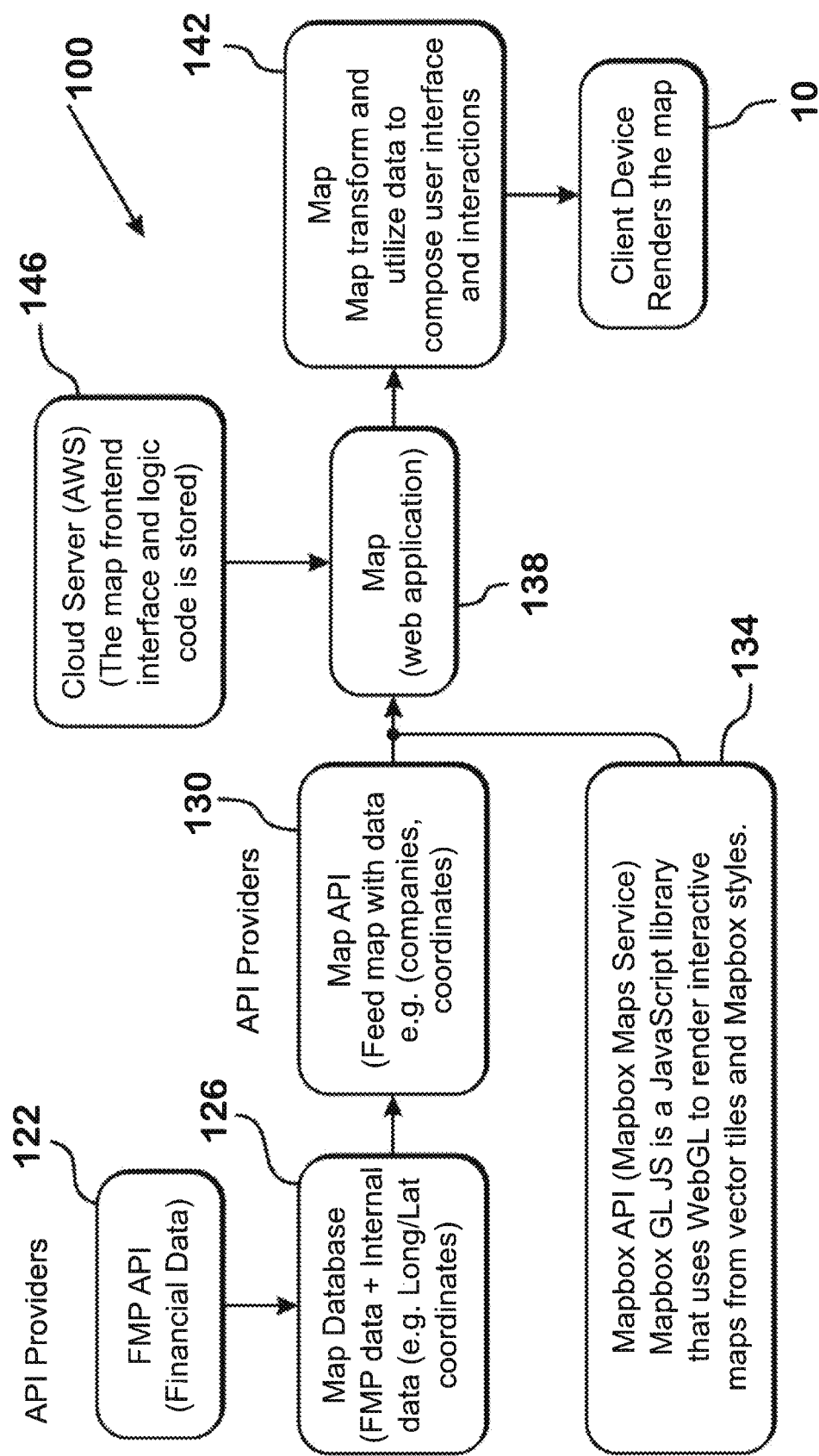
FIG. 5 is schematic diagram of an exemplary process flow for an interactive map display system according to an embodiment of the invention.
Figure 8:
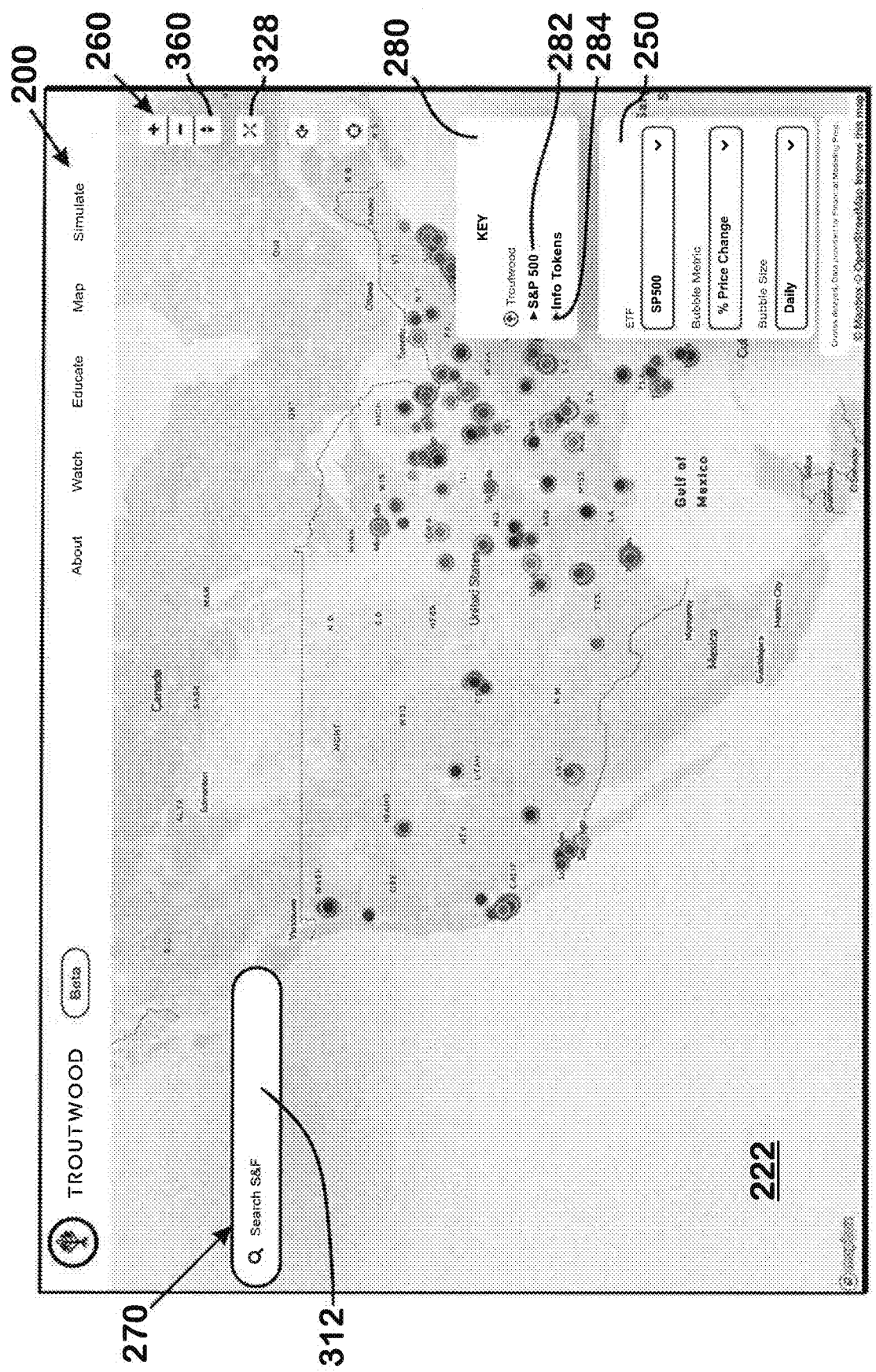
FIG. 8 is another screen shot of the user interface for an interactive map display system according to the invention showing a representative map as rendered providing a small scale map view, depicting a larger field of view, on a display of a computing device.

FIG. 5 provides an exemplary schematic diagram of the hardware infrastructure for an interactive map display system 100 according to the invention and depicts a third-party data API 122 that can be in electronic communication with a Map Database 126. The third party data API 122 may provide any nature of information, for example, frequently updated information, that is required for preparation of the interactive map display 222. For example, where the interactive map display is to depict financial information for companies that are listed and have shares traded in a financial market, the third party data API 122 may provide frequently updated financial data. Alternatively, where the information sought to be displayed is related to sports statistics or wagering odds, the third party data API 122 may provide sports statistics, or wagering odds. One skilled in the art may utilize the teachings herein to create any variety of maps utilizing information that is frequently variable, and tied to an object or entity that is able to be geographically located and displayed on a map. The Map Database 126 electronically communicates with, to receive and house data from one or more third-party data API providers 122, an may additionally provide internally populated data created or provided by the map administrator, such as the location coordinates (for example, longitude and latitude coordinates) for the accurate location of the primary icon elements 202a on the map image 222 as shown in FIG. 8, as will be discussed. Examples of data that can be stored in the Map Database 126 include stock ticker information, prices, company sectors, market capitalizations, etc. Any number of third-party map tile providers 134 (e.g. a Mapbox API providing map information compiled by MapBox) may be used in conjunction with the Map Database 126 for purposes of providing the background geographic map image information on which data, data visualizations, and other interactive tools and modules, as described below, may be rendered.

The collective information of the Map Database 126 can be accessed by the user through the Map API 130 and rendered on the user's device 10 using the Map Web Application 138. The Map Web Application 138 may further display information retrieved from a Cloud Server 146; specifically, a codebase (i.e. source code) enabling the user to see the web browser rendered Map Web Application 138 on the user's device 10. Through the use of the graphical user interface on the screen 11 of the user's computing device 10, the user can transform the interactive map display 222 and perform interactions with the map, with a variety of tools, as will be discussed below. Depending on the user's interaction, new data sets or data visualizations may be selected or the display may be refined on the client device 10.

Figure 6:
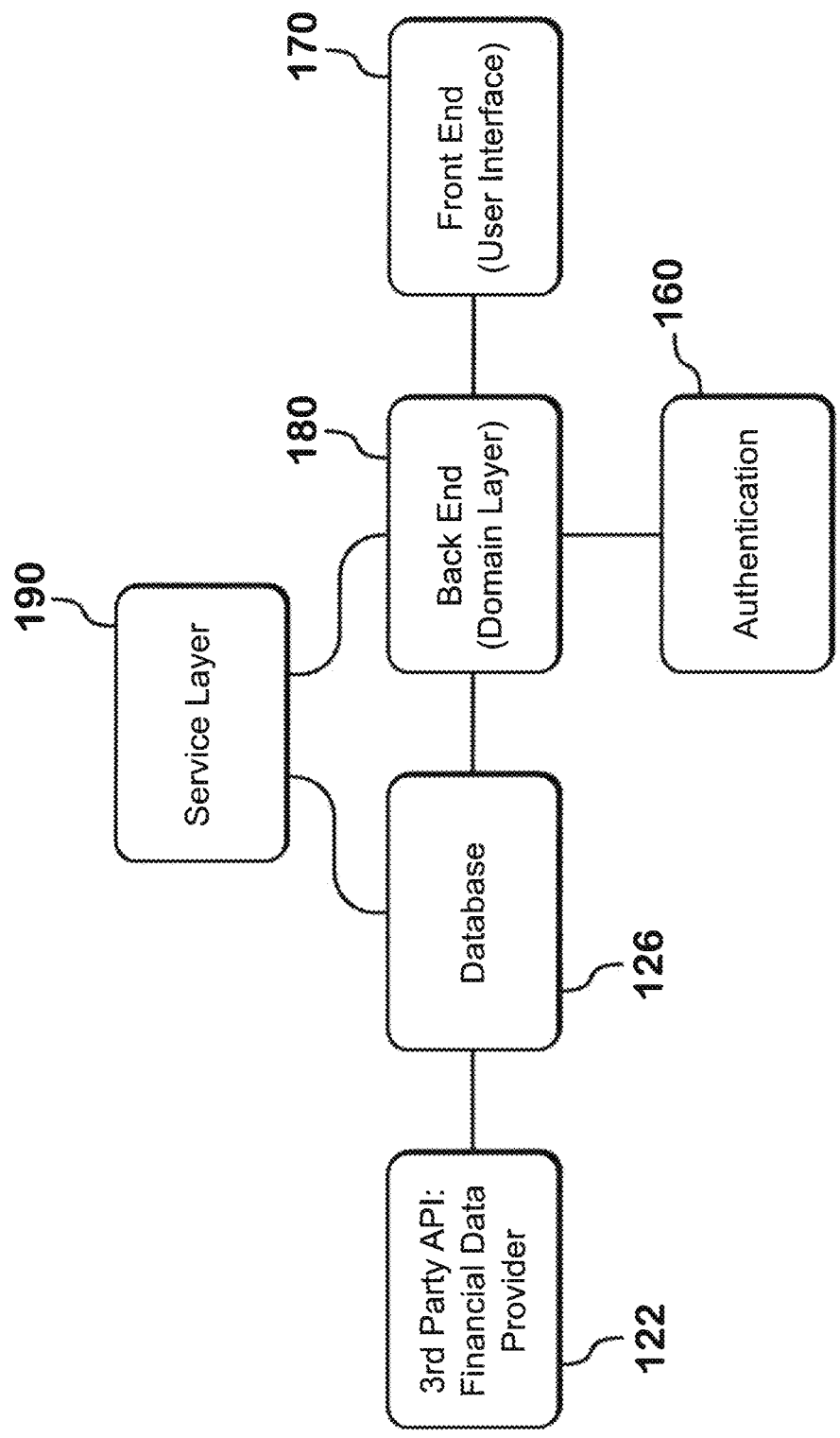
FIG. 6 is a schematic diagram of an exemplary hardware infrastructure for an interactive map display system according to the invention.

With reference to the alternative view of a schematic depiction of the interactive map display system 100 shown in FIG. 6 providing for authentication of the user by an authentication module 160, the interactive map display 200 could call for user specific database 126 parameters to be rendered on the display screen 11 (depicted on FIG. 1) for an authenticated user who has established credentials unique to that user within the authentication module 160; such as by establishing an authenticated session by using the graphical user interface to provide a username and password, or alternatively a hash value of the password, housed within the back end 180 (domain layer) of the system 100. One skilled in the art will understand that alternative methodologies of authenticating the user are possible and may utilized instead. Once confirmed as an authenticated user, the system 100 may enable features or views specific to that authenticated user.

The interactive map display system 100 further includes a plurality of service modules that are executable by the system, whether the processor of the computing device 10, or alternatively by one or more of the front end web server, back end application server, within the map web application 138.

Exemplary System Detailed

In an exemplary embodiment, the interactive map display system 100 provides a digitally rendered interactive map 200, for example, as shown with reference to FIG. 8.

The interactive map 200 may be displayed on any suitable display 11, including, but not limited to a general user interface on any suitable computing device 10, such as a computer monitor, television, tablet device or handheld device. The interactive map 200 includes features common on other interactive map systems, such as a user selectable scale to allow the user to zoom in or out, a user selectable button to initiate a re-center of the interactive map 200 display to the user's current location, and adjusting the extent of the region included within a display area. The interactive map 200 may be manipulated by dragging the interactive map 200 to alter the displayed region, and further, the interactive map 200 may be rotated on the display to change the orientation, as is known with digital interactive maps. When the interactive map 200 has been rotated away from an orientation with North in a vertical direction, the user may actuate the compass button 360, and cause the displayed map to automatically rotate, and revert to the default orientation, with North in a vertical orientation. It is further contemplated that the interactive map 200 view may be adjusted, providing an artificially adjustable user perspective, wherein the virtual perspective may be adjusted from a directly overhead view of the interactive map 200 features, to a view that would represent having a non-vertical perspective, for example, having an approximately 30 degree angle of incidence to the center point of the interactive map 200 (as discussed with reference to FIG. 17). The window or displayed map may be selectively maximized in usable size on the display screen using techniques familiar to those known in the art. The scale of the interactive map 200 display may be adjusted to revert to a default scale on the display by the user selecting the full scale button in the interface, whereupon the scale of the interactive map 200 will be adjusted to display the region of focus for the interactive map 200 display, which may be the continental United States, or any other global region, as may be desirable for the information being depicted in the interactive map 200. It is contemplated that the interactive map may be toggled between display modes, for example, a default display mode as shown in FIG. 8, or may be caused to display an overhead picture view, often referred to as either aerial or satellite imagery view (not shown).

The digitally rendered, interactive map 200 of the present invention is dynamic and provides functionality beyond that previously known from maps. The display on the interactive map of the present invention, for example, as shown in the exemplary embodiment depicted in FIG. 8, may provide one or more icons 202 that are located within the boundaries of the displayed portion of the interactive map 200. It is contemplated that each icon 202 displayed is indicative of the location for the element or object being represented. In the depicted embodiment, there are icons 202 depicted on the interactive map 200 representative of the location of corporate entities on the S&P 500 index of funds, though it is contemplated that maps may be prepared with icons 202 representing locations, businesses, entities, persons, or items distinct from those shown in FIG. 8. It is further contemplated that the user may select to filter or define the categories or characteristics of the icons 202 to be displayed, as will be discussed.

According to the invention, the interactive map display system 100 generally includes the following major components, run as core modules for the system, including, but not limited to: a map display module, an icon display module, a selection module, a filter module 250, a hover module, a zoom module 260, and a search module 270.

Map Display Module

The map display module utilizes the system and its components as depicted in FIGS. 1 and 5, and is configured to render on the display screen 11 of the user's computing device the digital information for the map display, where the digital information is provided by one or more of: a third party API 122 (for example, a Financial API providing financial data), a Map Database 126, a Map API 130, a third party map tile provider 134, and compiled together as a map view using the Map Web Application 138 and map front end interface 142 to provide the digital map image having one or more icons 202, as described herein, that are overlaid upon map content on the screen 11 of the user's computing device 10, along with the various tools and modules as will be described below, in order to provide the interactive map image 222.

Icon Display Module

In general, the icon display module is configured to position and display each of the icons 202 overlaid on the interactive map 200, with each icon 202 being associated with one or more entities, objects, or persons, utilizing data from the map database. In an exemplary embodiment, each icon 202 provided on the map display depicted on the user display screen 11 represents the location of a corporate entity, having assigned location coordinates on the interactive map 200, with the location for each icon being determined by electronic information retrieved from the map database. The location information (e.g., coordinates) may be provided utilizing address information from the third party API, or the map database provided by the map administrator within the system 100. One skilled in the art should appreciate that an icon 202 could represent any tangible or intangible item, as will be described later.

Figure 9:
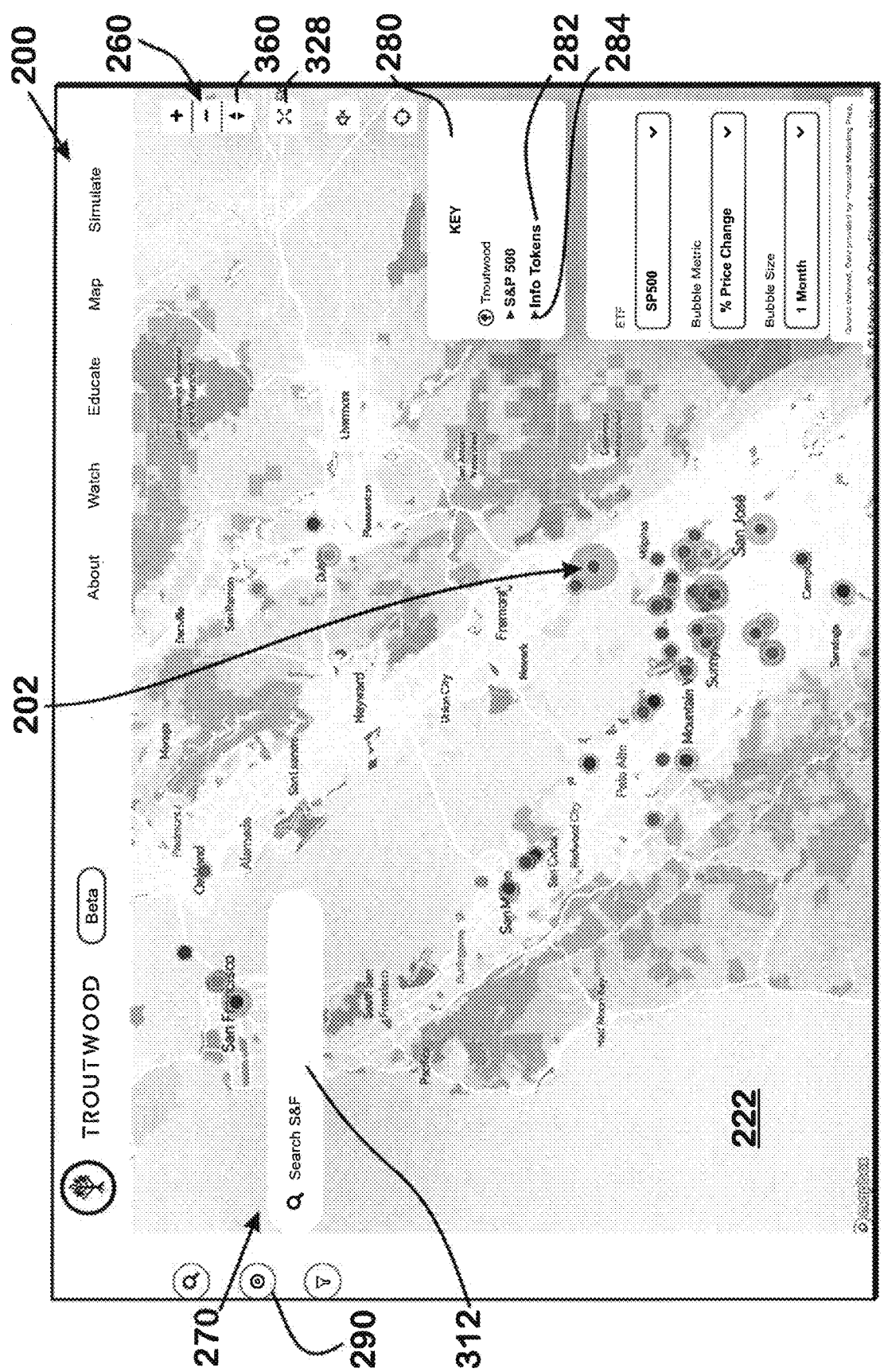
FIG. 9 is another screen shot of the user interface for an interactive map display system according to the invention showing a representative map as rendered on a display of a computing device.

In an exemplary embodiment of the invention, each icon 202 includes a primary icon element 202a and a secondary icon element 202b, as shown in FIG. 9. In an embodiment, the primary icon element 202a is a marker to indicate the location of the represented object or item on the display map. The primary icon element 202a may have an identifier name that may be displayed on the interactive map 200, or alternatively remain hidden and only become visible upon selection by the user, or by hovering a cursor over the icon, as will be familiar to those of skill in the art. The primary icon element 202a may be any suitable marker, and as shown in this embodiment, may be depicted in the form of a colored circle, centrally located within the icon 202. The primary icon elements 202a may be colored, marked, or otherwise indicate the sector, such as by being of a distinguishable shape or character, with corresponding listings within the key panel 280 to provide a key for interpreting the sector or category for the primary icon element 202a. Alternatively, the icon 202 may have an extended portion pointing to, or indicating the location, with the balance of the icon 202 being offset somewhat from the demarcated location. The primary icon element 202a may represent a variable that may be infrequently changed, or have a relatively low frequency of change, or be nearly permanent. For example, the primary icon element 202a may represent a corporate entity, having a location at a specific address depicted on the interactive map 200, which may be a place of business or company headquarters. It is contemplated that the information associated with the primary icon element 202a may infrequently be changed, or updated as warranted, such as when the business represented by that icon 202 undergoes a name change, merger, or undergoes a change in location, in which case, the primary icon element 202a or location may be updated. Alternatively, the primary icon element 202a may be updated when a building changes tenants, and a new business is established at the location. It is contemplated that the primary icon element 202a information may be updated less frequently than daily, or may be updated for less than the entirety of the icons represented within the interactive map 200.

The icon display module is configured to provide for the display of the primary and secondary icon elements 202a, 202b comprising each of the icons 202 on the map image 222 being displayed on the interactive map display 200. The icon display module is configured to provide, for each of the primary icon elements 202a, a rendering of the primary icon element 202a in the location on the map image 222 being displayed, corresponding to the geographic coordinates (i.e., Longitude and Latitude) according the information for the entity represented by that icon 202, as stored in the database 126 for each item within that data set that is chosen by the user for display (i.e., for all of the visible icons 202 on the portion of the map image 222 being displayed); or alternatively, for each item contained within a default data set of the map administrator's choosing.

Furthermore, the icon display module is configured to provide for the each of the secondary icon elements 202b, the visualization metric that allows representing the frequently updated data. In an exemplary embodiment, the secondary icon element 202b is bubble data visualizations, as depicted in FIG. 9, where each secondary icon element 202b is rendered around each primary icon element 202a eligible for display, with the secondary icon element 202b providing a visualization metric based on data values associated with a user selected parameter, such as where the secondary icon element 202b is a bubble metric (as shown in FIG. 9) representing a financial statistic, such as Market Capitalization. The system varies the size of the secondary icon element 202b (i.e. each bubble) rendered based on the data value's size relative to other values within the overall data set selected by the user or, if the user chooses, the secondary icon element 202b may be rendered based on the absolute value of the specific data, with the size of the secondary icon element (i.e., each bubble) rendered in accordance to a scale predetermined in the database, by the database administrator.

In an exemplary embodiment, the user may select a range of data points (e.g. companies meeting certain criteria) to display on the map image 222, for example, by using one or both of the filter module 250 or the zoom module 260, as will be discussed. The data points utilized in generating the interactive map display 200, or utilized for preparing the secondary icon elements 202b may include for example, all items existing within the map database 126 (even if not shown on the portion of the map image 222 that is displayed), or may include only those items displayed on the map image 222 being displayed on screen 11; or alternatively, may be a user-defined subset of icons, such as may be compiled by filtering, or searching, as described elsewhere.

In this manner, the icons 202, specifically, the primary icon elements 202a are rendered based on the geographic coordinates of the datapoints within the eligible dataset selected by the user, with visual scale utilized to generate the secondary icon elements 202b determined by one of the previously described methodologies.

With reference to FIGS. 8 and 9, further aspects of the secondary icon element 202b will be described. In an exemplary embodiment, each of the secondary icon elements 202b identifies a frequently changed aspect associated with a primary icon element 202a. The secondary icon elements 202b may be varied in one or more characteristics on the display, which may be periodically or a periodically updated, with a frequency of updates applied in a range of at least once weekly, at least once daily, and repeatedly through the course of the day, and may be updated hourly, or more frequently, and may approach near real-time data. In this disclosure, the term "frequently" is thus meant to mean aperiodically update in the range of more than once weekly, often at least daily, and typically, repeatably through the course of a day. In an embodiment, the interactive map 200 is dynamic, and an update may occur each time the interactive map 200 screen, or webpage with the interactive map 200 screen is refreshed, or as the interactive map 200 contents, and display parameters are adjusted on the display. The secondary icon element 202b may visually convey an amount of varying information associated with the primary icon element 202a. It is contemplated that during the updates of the information in the database used for generating the secondary icon elements 202b, all, or nearly all of the icons would be updated to reflect the varying information. It is contemplated that from one update to the next, there may possibly be no net change for one or more of the icons 202, though it is anticipated that there would more likely be some difference in value for some data sets for one or more of the secondary icon elements 202b between updates. The secondary icon element 202b may be varied in depiction by one or more of size, color, and opacity, in order to indicate a direction, ranking and/or magnitude of the change, or represent the current numeric value of the information being conveyed through the secondary icon element 202b on the display. For example, where the secondary icon element 202b represents financial performance of a company, it may be varied in size and opacity, where a larger change in the performance value may be reflected by one or more of greater opacity, deeper shade or tone of color, or size, such as a greater partial radius of the disk surrounding the primary icon element 202a. The value that is being represented by the secondary icon elements 202b on the map display may be user selectable from a system provided list of entries, as will be discussed.

In the exemplary embodiment depicted in FIG. 9, the secondary icon element 202b is depicted as a disk surrounding the primary icon element 202a, and provides an indication of the direction and magnitude of change of, in this instance, the share price for the company associated with the primary icon element 202a. In this embodiment, the size, or partial radius of the disk of the secondary icon element 202b, indicates the magnitude of change, where the color indicates the direction of the change. In an embodiment, a secondary icon element 202b may be colored green, and would be associated with a beneficial change in the data value, such as an increase in the share price, while a red colored secondary icon element 202b would be associated with a detrimental change in the data value, such as a decrease in the share price. It is contemplated that alternative colors, or value directions may be suitable employed, especially where there may be an explanatory key to explain the meaning of the depicted secondary icon to the user. Various depictions of the secondary icon elements 202b are visible with reference to FIG. 9, depicting primary icon elements 202a having secondary icons elements 202b that may be colored to indicate positive growth (in green) and negative growth (in red), as well as having relatively large percentage increase or decrease, proportionally reflected in the partial radius of the secondary icon elements 202b.

Hover Module

Figure 10:
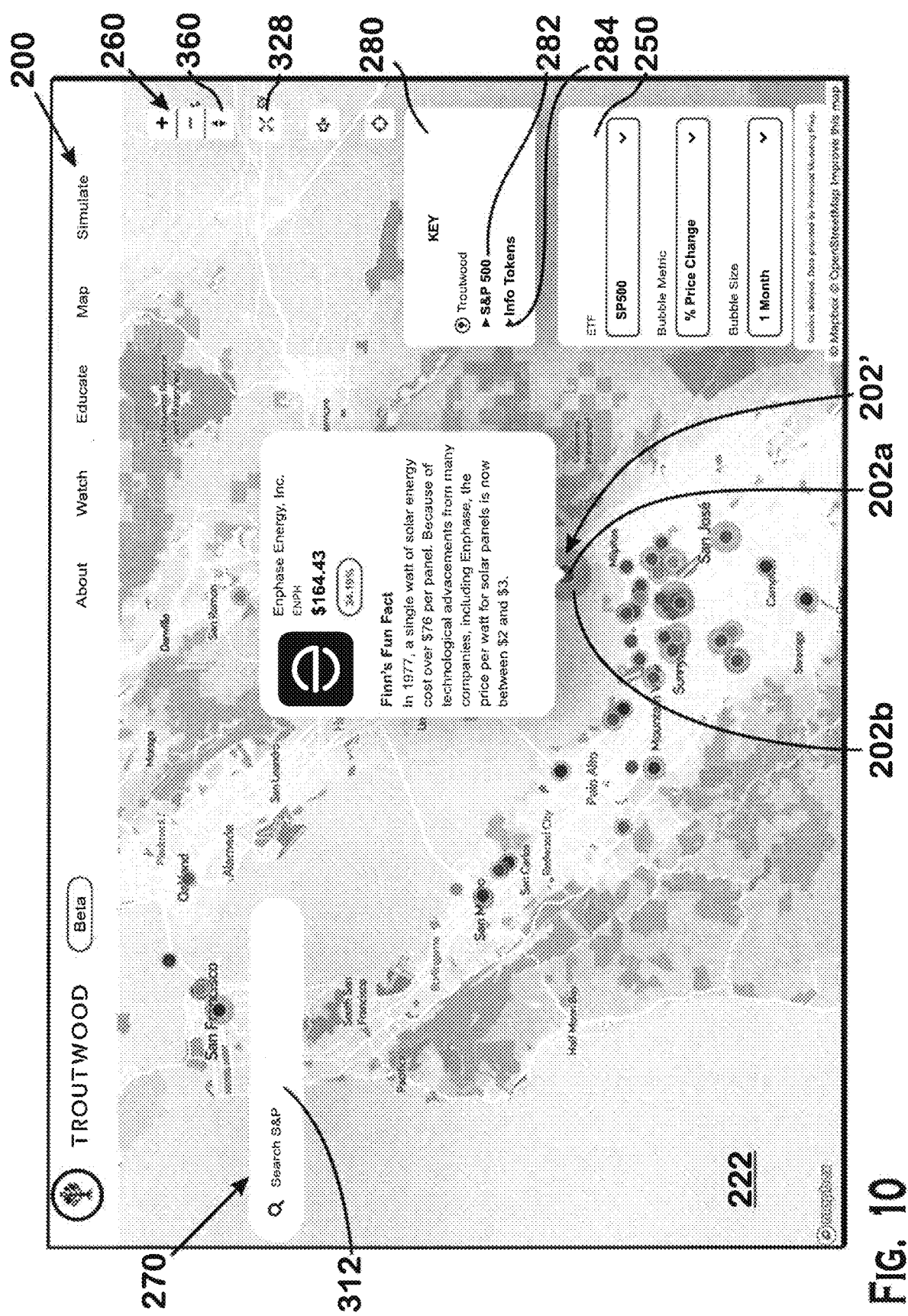
FIG. 10 is another screen shot of the user interface for an interactive map display system according to the invention showing a representative map as rendered on a display of a computing device, where an icon having a secondary icon element 202b indicating positive growth of the stock price has been selected and the display includes an additional information panel for the selected icon.
Figure 11:
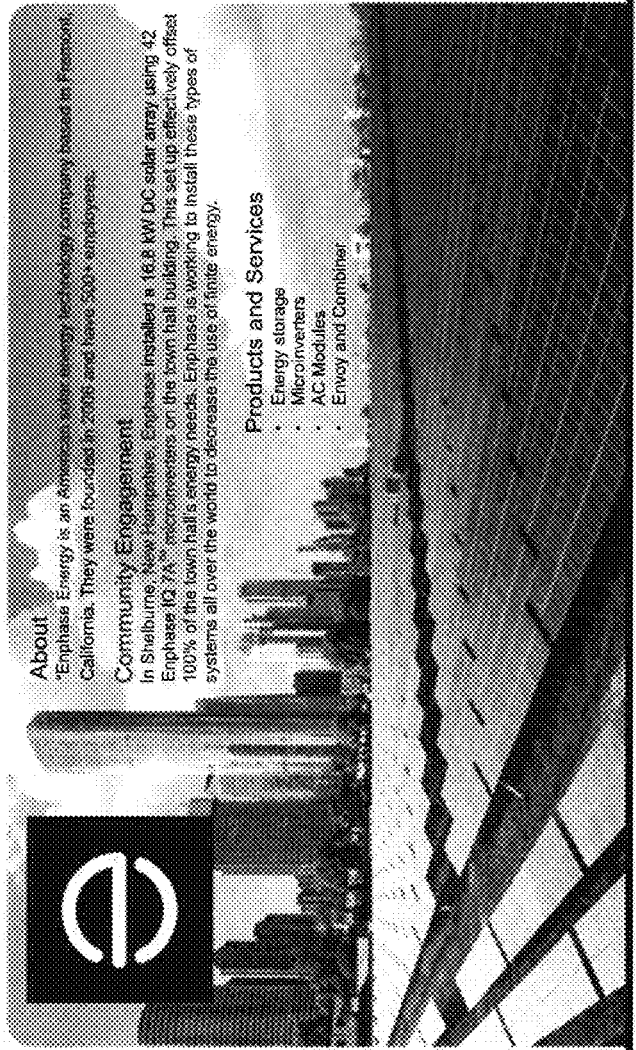
FIG. 11 is a screen shot of the user interface depicting an exemplary additional information panel in the form of a fact sheet containing information for the icon selected in FIG. 10.
Figure 12:
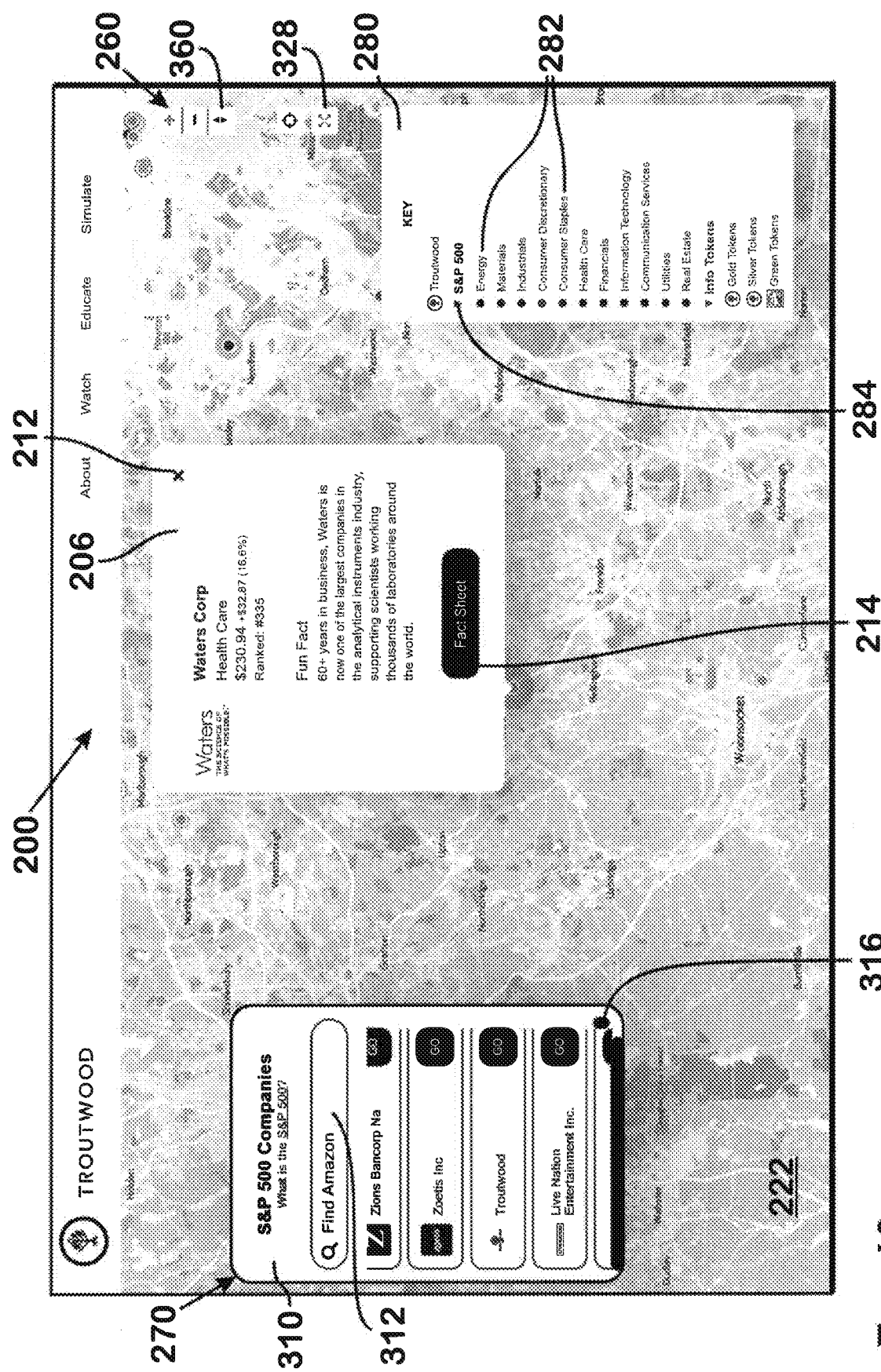
FIG. 12 is another screen shot of the user interface for an interactive map display system according to the invention showing a representative map as rendered on a display of a computing device, where an icon having an relatively large increase in the stock price has been selected and the display includes an additional information panel for the selected icon, as well as the key panel, and search panel.
Figure 13:
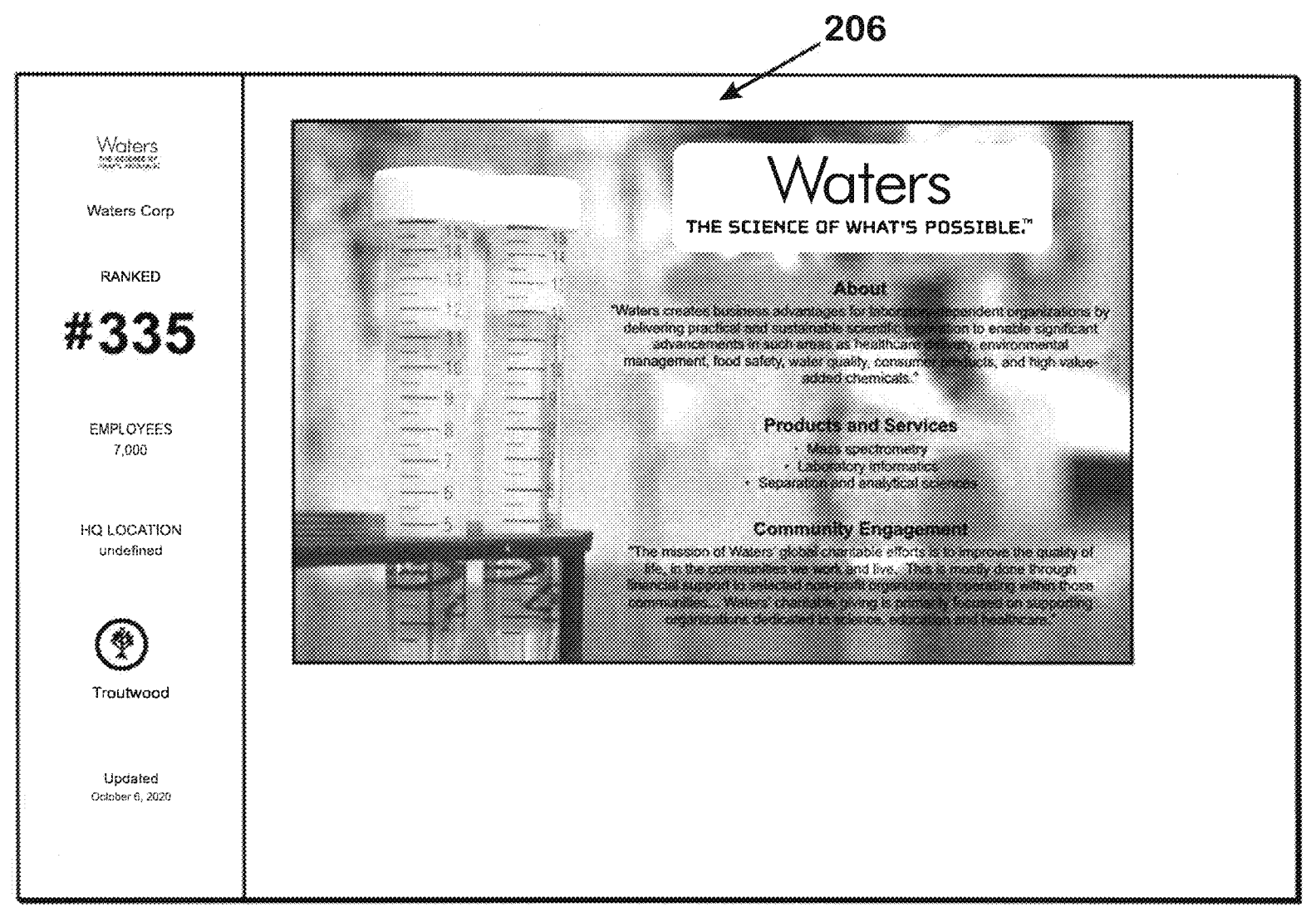
Figure 14:
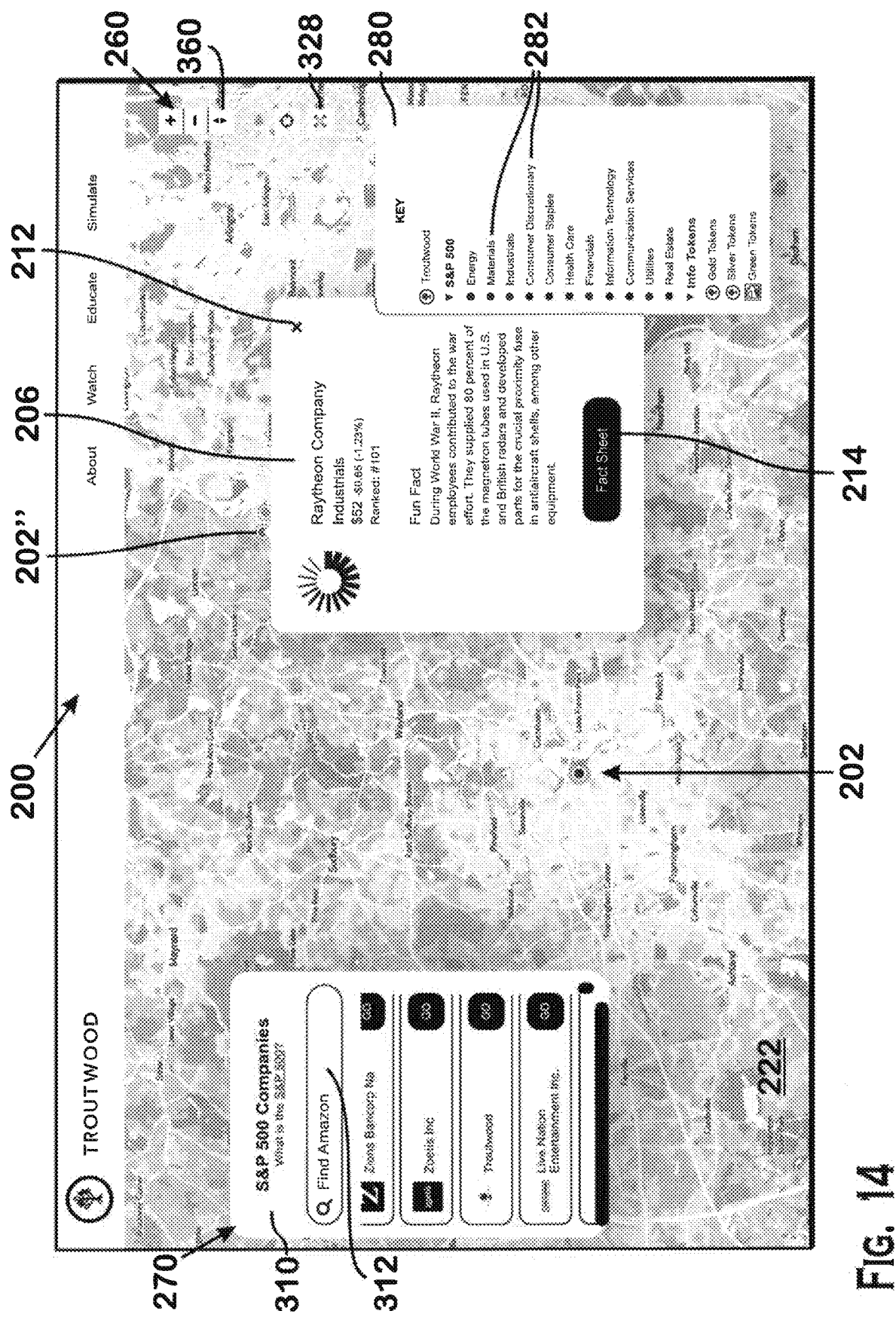
FIG. 14 is another screen shot of the user interface for an interactive map display system according to the invention showing a representative map as rendered providing a large scale map view, depicting a smaller field of view on a display of a computing device, where an icon having a relatively small decrease in the stock price has been selected and the display includes an additional information panel for the selected icon, as well as the key panel, and search panel.
Figure 15:
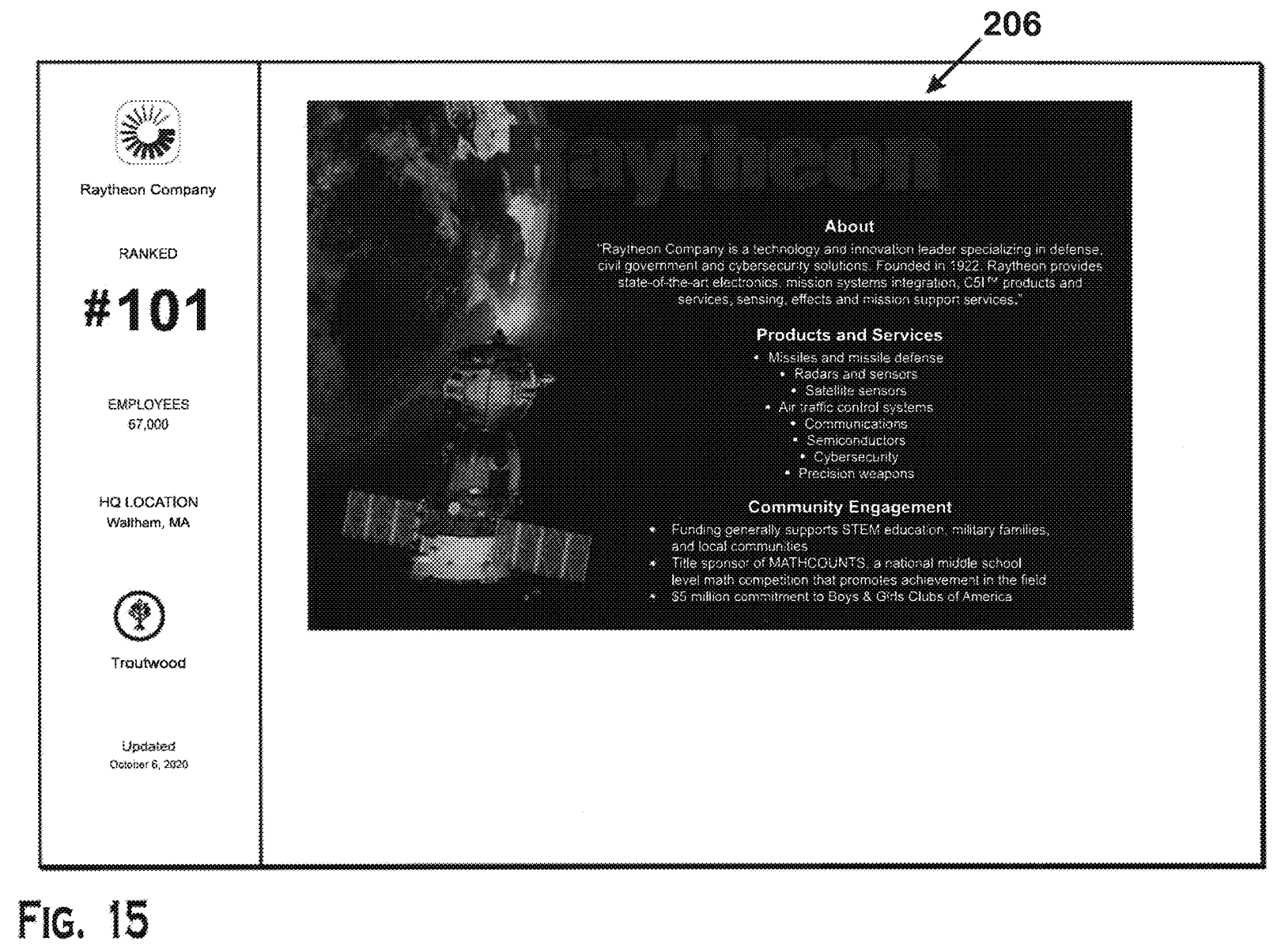

In an embodiment, the user may place the cursor over (e.g., hover) any one icon 202 on the display, and thereby select the icon 202', whereupon the system may render an additional panel 206 on the display, either overlaying a portion of the interactive map 200 image (as depicted in FIG. 10), or adjacent to the interactive map 200 image, with expanded details and information relevant to the facility, or item being represented by the primary icon element 202a. In an embodiment, a viewer browsing the interactive map 200 may hover the cursor over any one of the icons 202 displayed on the digitally rendered interactive map 200, and the system 100 may cause to be displayed at least the name or unique identifier being represented by the icon 202, and optionally display the metric information for the secondary icon element 202b corresponding to the selected icon 202'; or alternatively an additional panel 206 may be displayed in this manner by way of a hover module, so that a user can rapidly browse the information made available for a variety of icons 202. In such an instance, with reference to FIG. 10, if the user were to move the cursor away from hovering over the selected icon 202', the additional panel 206 may automatically close, as can be seen with reference to FIG. 9, or alternatively may remain visible until affirmatively closed by an action taken by the viewer, such as selecting a button to close the additional panel, for example, where there is depicted in FIG. 12 an 'X' or "Close" button 212 in the top right of the additional panel 206, which may be selected so as to remove the additional panel 206 from the display. As can be seen with reference to FIG. 11, the additional display panel 206 may depict, the name of the item represented by the icon 202, and details about the item, for example, provided as a fact sheet and include information such as an address, the performance or variable data that is gathered, or selected to be displayed by the user, where the user is able to customize the contents of the additional display panel. The additional panel 206 in the form of a fact sheet may be created within the system using a specific gesture or instruction, for example, by a left-click of the mouse button, or a press and hold with a stylus. Alternatively, moving the cursor over a selected icon 202', and performing a gesture or action, such as a right-click with the mouse, or a double tap with a stylus, may bring up the additional panel 206, as shown in FIGS. 12 and 14, which includes a user selectable fact sheet button 214, whereby selection will then display a detailed fact sheet, as depicted in FIGS. 13 and 15. Additionally, the additional display panel 206 may display a logo for the selected icon 202', and optionally, some informational aspect, such as the history, or other interesting information about the represented item or entity. It is contemplated that the additional display panel 206 information, by providing entertaining or interesting facts, or other statements about the represented item, may encourage browsing of the interactive map 200 by the user, thereby providing enhanced opportunity for educating the user, as the user would be more likely to use the interactive map 200 where it is providing some entertainment. One skilled in the art will recognize that the specific gesture or input from the user to cause these, and other actions within the system may readily be substituted for another gesture or input action, and could readily by programmed by the administrator, or optionally be user selectable, to provide a different response, yet fall within the spirit of the teachings herein.

The system may be configured such that as a user moves a cursor or cursor equivalent (e.g. finger or stylus) over an icon 202, an additional panel 206 is rendered in visual association with the primary icon element 202a. In an embodiment where the additional panel 206 is created on the display by the system as the cursor is placed over the selected icon 202' the additional panel may be a hover panel, as it is only open so long as the cursor remains over the selected icon 202'. In such an instance, the web browser recognizes the mouse event, such as the cursor touching or being moved over the primary icon element 202a of the selected icon 202'. As a result, the additional panel 206 that results from the cursor hovering may be generated automatically upon occurrence of the mouse event as it is triggered within the system and thereby generating the hover window as the additional panel 206, such that the additional data related to the selected icon 202' (e.g. a company) may be viewed. Exemplary data that could be viewed in this additional panel 206 include Fun Facts, stock price, price change, or any other statistical information in the database associated with the icon selected 202'. While the description for the additional panel 206 has been with regard to financial aspects, it is contemplated that the data collected, and may be displayed on the map, or within the additional panels may be concerned with other sorts of information, including as non-limiting examples, the sports and wagering odds statistics described below (see table 1), all of which could be stored in the Map Database and/or locally on the user device, and associated with the icon associated with objects or entities and capable of being represented on the display.

Each icon 202 within the system has a unique identifier, e.g, name, location coordinates such that each icon is only associated with a specific data object or data set within the database. Thus, as the cursor is caused to move between icons 202 on the display, a different set of information would be called for from the database, and rendered as additional panel 206 information on the display.

It is contemplated that the contents of the additional panel, such as a hover window, may be determined by the user through a menu or other selection interface. For example, a user may wish to see Fun Facts in the additional panel. Alternatively, a user may wish to see any other sort for associated date, for example, the associated Revenue data for an entity, and so forth, in this manner, the user may customize the information to suit the user's needs.

Selection Module

In an embodiment, the interactive map 200 may be caused to display, upon selection of one of the icons 202 on the interactive map 200, a user selectable trigger or button, using a select module, which upon selection may initiate an action related to the selected icon. Such a button may be brought up within the aforementioned additional information panel 206 that is specific to a selected icon.

The selection module enables the user to select a user selectable button that could be displayed following a specific user action, such as a "right-click" where a mouse event occurs. The user selectable button could be used to facilitate a function within the system, such as "Buy Now", "Buy Local", "Trade", "View Job Listings", etc.

The selection module is configured to provide a web browser that is configured to handle the triggered event or user action. The web browser handles the specific instruction as defined in the source code, in order to carry out the needed action prompted by the specific user action, which may be displayed on the screen (an example being a common stock brokerage transaction interface enabling purchase or sale of securities) and or to facilitate instructions to third-party applications (the example below).

In an exemplary embodiment of the selection module, instructions may be sent to third-party API's, enabling an authenticated user having a previously linked brokerage account, to transact shares of stock via the described interface and actions.

The user selection module may be configured such that when a user moves a cursor or cursor equivalent (e.g. a stylus or finger) over an icon 202, an additional panel 206 which may be in the form of a hover window, or alternatively a persistent window that remains in place even after the cursor is moved away from the icon. Such an additional panel 206, may be rendered in visual association with the selected icon 202' as the web browser recognizes the mouse event, such as the cursor touching the primary icon element 202a. An additional panel 206 may be generated automatically once the mouse event is triggered (for example, a right click), generating the additional panel 206 window, such that that additional data related to the selected icon 202' on the map display (e.g. company and statistics) may be viewed. Alternatively, other sorts of data could be viewed in this additional panel 206, include Fun Facts, stock price, price change, or any of the information from Table 1, as non-limiting examples. It is contemplated that some or all of the data may be stored in the Map Database and/or locally on the user device, for retrieval and rendering on the map display 200.

Each icon 202 within the system has a unique identifier, e.g, name, location coordinates such that each icon is only associated with a specific data object or data set within the database. Thus, as the cursor is caused to move between icons 202 on the display, and user action causes the selection of the icon 202, a different set of information would be called for from the database, and rendered as additional panel 206 information on the display.

It is contemplated that the contents of the additional panel, such as a persistent window, may be determined by the user through a menu or other selection interface. For example, a user may wish to see Fun Facts in the additional panel. Alternatively, a user may wish to see any other sort for associated date, for example, the associated Revenue data for an entity, and so forth, in this manner, the user may customize the information to suit the user's needs.

In an exemplary embodiment, where the interactive map 200 display contains financial investment information, the selection module is configured to displayed a user selectable link or button within the additional display panel 206, which upon being selected or actuated, would initiate a procedure, such as causing an order to be placed with a broker to sell or purchase a stock investment in the selected corporation. Where the user has been pre-approved per FINRA requirements for broker/dealers, the selection of the user selectable button and subsequent confirmation of an amount may complete the requested transaction for the stock purchase or sale. Alternatively, selection of the button may initiate the approval process, per FINRA regulations, required to complete the transaction.

In an embodiment, the selection module is configured to facilitate the user's ability to obtain information or research icons that are in geographic proximity to the user, or the display may include a user selectable button or trigger to initiate a "buy local" action. The trigger for the "buy local" action may be a button displayed on the main map screen. When the "buy local" button is selected by the user, the system may bring up a list on the display, optionally in a new panel window, of all the icons 202 within a relevant geographic range, which may be a user or administrator defined setting, or may be a user selectable radius. In another embodiment, the "buy local" trigger may bring up a list of the nearest icons, sorted by distance from the user's location.

In an embodiment, the selection module is configured to have the user device 10 transmit location data (e.g. longitude/latitude coordinates) to the service layer 190 of the system (see FIG. 6). The backend database houses a list of businesses categorized by product or services, along with the database containing longitude and latitude coordinates which may be associated with an area or radius surrounding the user device. The selection module thus can determine which businesses meet the criteria, whether distance, or business category, to be displayed on the map display when the user initiates a "buy local" action.

Filter Module

The filter module is configured to allow the user to apply filters to a listing of the entries, such as by selecting the categories of icons that are to be included in the display list. With reference to FIG. 12, in an exemplary embodiment, the filter module allows the user to select, for example, one or more categories from the key panel 280, or filter by any variety of relevant characteristics displayed in the table or listing, as would be familiar to those of skill in the art. The filtering of entries may alternatively be based on a variety of factors, including distance from the user's location (or a user defined location), sector or class (such S&P 500 sector, or industry group), share price, change in share price, market cap, P/E ratio, revenue, and/or number of employees. Alternatively, where the entries are sports teams, the filtering may be based on league, division, sport, class, as non-limiting examples. The interactive map 200 may be customized to each user, such that the user would be capable of filtering the icons to be displayed to include only those icons representing companies that the user has invested in, or has been placed on a watch list. The system may employ stock screening techniques as known to those skilled in the art to filter the results such that only those icons 202 that meet the screening criteria are displayed on the interactive map display 200. It is contemplated that the user may be able to create a watch list by reviewing the interactive map 200 display, and can generate a user-specific watch list by selecting specific primary icon elements to be added to a watch list, or alternatively the user may drag the primary icons onto a watch list panel that may be provided on the display. In an embodiment, the system 100 can be linked directly to the user's brokerage account, such that the user can select one or more of the primary icons displayed on the interactive map 200, and optionally, may allow the user to initiate an investment in those selected icons by purchasing shares in the entity through the user's brokerage account. The initiation of investment through the interactive map 200 system may utilize a "buy it now" feature as discussed above, where selection of that feature triggers the purchase of selected stocks or funds through a suitable brokerage account. It is contemplated that the user may filter results or create a watchlist through the system, that may then be utilized to create a user-specific fund comprising the selected entities, and through the linked brokerage account initiate purchases in those entities. Alternatively, it may bring up a list of all the icons 202 displayed on the current map view 222, presented as a table and providing for each listing one or more of the aforementioned characteristics, and sortable by any of the characteristics, such that the user may select one or more of the listed entities in which to invest, or initiate the procedure for completing a purchase of the selected items.

In another embodiment, the user selectable "buy local" button, as has previously been described, may allow the user to review any variety of vendors in geographic proximity to the user. For example, a user may wish to support local businesses, or a business may wish to encourage consumer interest. In an exemplary embodiment, any business that would sell directly to a consumer, including, as non-limiting examples, vendors or businesses such as, restaurants, service industry or companies, coffee shops, t-shirt vendors, grocery stores, pharmacies, book stores, hardware stores, farmer's markets, etc., and would benefit by stimulating consumer activity, may seek to display their goods or services for purchase by a consumer on any map display embodiment contemplated herein. In the various systems contemplated herein, where the user selects "buy local" on the interactive map 200 display, the interactive map 200 may provide primary icon elements 202a for all vendors that may provide products, goods, or services that are located nearby, or alternatively, only those vendors that have subscribed to a service for the system 100 or agreed to make their services and goods available through the embodiments contemplated herein. These primary icon elements 202a may be as previously described, and may, though not necessarily, include the secondary icon element 202b discussed previously. For example, where a user selects a geographic location, or is located in a geographic location, and selects the "buy local" trigger, it is contemplated that one or more icons 202 representing vendors may be rendered upon the user display. The user may select one of the icons, and the system may initiate a transaction, or display a link (such as a menu) or user selectable "buy it now" button or trigger that would initiate a transaction. It is contemplated that the vendors on the display may be sorted, or filtered by any one or more of distance, the nature or category of business, products, cost, or combinations thereof. It is contemplated that the "buy local" trigger, when actuated may display a listing of goods or services directly on the display, which the user can then select for completing a purchase or initiate a service, which may be through a "buy it now" button as has been described. Any nature of business that sells directly to customers may utilize such a service to drive increased consumer traffic to their business, as the user can select products or services directly from the interactive map 200 display and initiate, or complete a transaction thereupon, without necessarily having to visit the user's website or location directly. It is contemplated the system may be beneficially combined with electronic transaction technologies, such as apple pay, paypal or the like, or utilize stored credit card, bank, or other payment information within the system, so as to effectuate the user's purchases automatically when selected by the user.

In an exemplary embodiment, and as can be seen with reference to FIG. 8, the interactive map 200 display may provide the user a control option to selectively filter the categories of the icons to be displayed on the interactive map 200. In such an embodiment, the interactive map 200 display may provide a key panel 280 identifying key elements that may selectively be turned on or off in order to display, or remove from the display, the representative icons 202 for each key element 282 from the list provided in the key panel 280. In this fashion, a user may select to display a group or class of icons 202, or alternatively remove from the display all of the icons 202 that would fall into the category represented by each of the key elements 282, for which the display option be selectively turned off and on. From within the key panel 280 having the key elements, the act of selecting the individual key element 282 may cause the toggling for the respective icons 202 of the display on or display off. Alternatively, adjacent to each key element 282 may be a selectable button that may be toggled so as to selectively display, or not display the icons from that category. The key elements 282 may have sub categories that can be toggled to be displayed or not, by selecting a subcategory display button 284, such as an arrow adjacent to the key element 282, as can be seen with reference to FIG. 8.

Each of the key elements 282 within the key panel 280 may have assigned a display characteristic, one or more of color, or alternatively a depiction, figure, or unique symbol to be associated with that key element. Each of the icons 202 included on the interactive map 200 display would be assigned to at least one key element 282, and the association would be reflected in the primary icon element 202*a* matching the key element, by having one or more of the same color, depiction, figure or symbol. For example, and with reference to the interactive map 200 of FIGS. 8 and 12, each key element 282 is to have an assigned color. For example, the member icons 202 that correspond with the key element "energy" are to be displayed on the interactive map 200 when the key element "energy" is selected or toggled on for display. Note that where the key element is visible, that status may be reflected in the key panel 280. Within the interactive map 200 display, all icons 202 that fall into that category key element 282 are displayed, and as depicted, the color of the displayed icon's primary icon element 202*a* would match the color associated with the key element. Selection of one or more of the other key elements 282 to be displayed (e.g., using the filter function) would cause the interactive map 200 display to include all the other icons 202 for whom the categories of key elements 282 are toggled to be displayed.

Furthermore, within the key elements panel 280, there may be an option to display a class of icons representing alternative categories, which do not themselves fall into the traditional key elements. For example, as depicted in FIG. 8, there may be an option to display one or more key elements in the form of info tokens, which may themselves fall into subcategories, such as gold, silver and green info tokens. These may be customized for any suitable map application. As contemplated here, the gold tokens may represent business success stories, where the interactive map 200 is concerning financial market information. Silver tokens may represent information that may be of interest to the user, and green tokens may represent notable aspects relevant to environmental concerns. It is contemplated that these info tokens provide an avenue for entertaining and informing the user in some fashion, so as to stoke the user's interest, and encourage exploration and continued use of the interactive map 200 display. All of these elements may combine to further the user's education in aspects taught by the interactive map 200, for example, to further investor education, or foster excitement in the sports betting market, or encourage the exploration of the interactive map 200 display, for any suitable concept which may be depicted with the interactive map 200 system.

In an embodiment, the interactive map 200 may be provided initially in a default display, for example, as shown with reference to FIG. 8, where the primary icon and the secondary icon represent categories of information that are pre-determined, depending on the nature of the interactive map 200 being presented. The user may be provided with a menu option panel 290 allowing the selection of alternative categories of information to be displayed on the interactive map 200. In this manner, the user may opt to modify the content represented by either or both of the primary icon element 202*a* or secondary icon element 202*b*. In such an instance, the user may elect to modify the nature of the information represented by the secondary icon element 202*b* on the display to be a different category of information. As a non-limiting example, where the interactive map 200 displays financial performance information for corporate entities, the user may opt to have the secondary icon element 202*b* changed from a default option, such as stock performance as shown in the figures, and instead represent, for example, the price to earnings ratio (P/E ratio) for each of the primary icon elements 202*a*. It is recognized that the secondary icon element 202*b* may be any suitable metric.

Zoom Module

It is contemplated that as the interactive map 200 is navigated, or the display is adjusted in zoom scale, the icons 202 presented on the display may be adjusted relative to each other, optionally after updating the data for the secondary icon elements 202*b* electronically. For example, in an embodiment, the secondary icon elements 202*b* are varied in a characteristic based on the data, e.g., varied in proportion or gradient, as described previously, it is contemplated that the highest and lowest values, as well as the relative scale of the icons remaining on the revised map would cause a recalculation or adjustment of the displayed secondary icon elements 202*b*. Thus, it may be the case that for each instance of map navigation or zoom change, the system would be caused to adjust the display of the icons 202, such that they are revised to reflect the revised display.

With reference to FIG. 8, there is provided a small-scale map view, depicting a larger field of view, and showing various icons' respective placement within the United States. It is anticipated that the interactive map 200 could be utilized to show the locations of other objects or entities worldwide, and need not be limited to the United States as shown. Using a zoom module 260, having buttons that allow adjustment in scale of the map display (e.g., "+" "–", or reset to default), the zoom module 260 is configured to cause the interactive display map 200 to be adjusted by the user, such that the scale of the map presented may be adjusted. For example, the interactive map display map 200 may be provided as a large-scale map for example, as shown in FIG. 12, focusing on a specific area, with a relatively smaller field of view, and likely having fewer icons 202 than would be found in the small scale map, with a much larger field of view, as shown in FIG. 8. In the shown embodiment of FIG. 8, the icons 202 depicted on the map represent members of the S&P 500 listing in a specific geographical location, depicted here as the continental U.S., with the various primary icons elements 202a representing the sectors identified on the key panel 280. Utilizing the zoom module 260, and selecting the "+" button would cause the scale of the map to be revised, and focus in on a progressively smaller field of view as the zoom is revised repeatedly. Similarly, the selection of the "−" button would cause the scale of the map to be revised in the opposite manner as selecting the "+" button. Regardless of the current scale displayed, selection of the default scale button 328 would cause the scale of the map displayed to revert to a default zoom level. The actuation of the zoom module 260 will cause the map web application to adjust the scale for the display, and where the required information is not stored locally on the user device, or in the map web application, may require digital information for generating the revised map display to be retrieved from the third-party map tile provider, as will be familiar to those of skill in the art.

Search Module

With reference to FIG. 14, the search module 270 will now be described. The search module is configured to provide a search function for the interactive map system 100. The search module 270 provides a search panel 310, and provides a text entry panel 312 to facilitate selection of an entry, as will be explained. In an embodiment, the interactive map 200 display may provide a search panel 310, through which the user may enter a keyword, or category in a text entry panel 312, provided as a search bar within the search panel 310, that is configured to allow the user to enter a text string, and cause to be displayed the resulting information in the search panel 310. In the exemplary embodiment, and as can be seen with reference to FIG. 14, the interactive map 200 display provides investor information, and specifically market data for an investment index, where the search bar text entry 312 would cause the system to perform an electronic keyword search for hits within the database to locate the listing of companies included within the index. Thus, the user may enter a word, or part of a word in the text entry panel 312, and the system would then list relevant search response hits in the search panel 310, from which the user may select one of the resulting listings, such as by selecting the entry with a user action, such as a mouse click or other suitable action or gesture. Upon selection of the entry from the search panel 310, the interactive map 200 would navigate to center the location of the relevant icon 202 on the interactive map 200, and optionally bring up the additional information panel 206. In an exemplary embodiment, the partial entry of "ray" into the text entry panel 312 would bring up a list of results, including "Raytheon Company" and "Raymond James Financial, Inc."; and as depicted in FIG. 14, the user had selected Raytheon Company, as the display has navigated the interactive map 200 display and adjusted the zoom to have the representative icon 202 for Raytheon Company centered within the display, and at a large scale. Alternatively, the search module 270 would allow a text entry panel 312 to receive a text string, and the system would access and perform a word search within the listing of company description entries within the database 126, and in this manner, the search results may provide a listing of companies with the keyword appearing in their description, and not necessarily limited to the tile of the company only. Along with the interactive map 200 adjustment, the system may optionally provide auditory feedback confirming the selection and subsequent map adjustment. Selection of another entry from the list of search results would cause a similar adjustment to the interactive map 200 to bring the appropriate representative icon 202 to the center of the interactive map 200 display, and render the appropriate information panel 206 for the selected icon 202.

Figure 16:
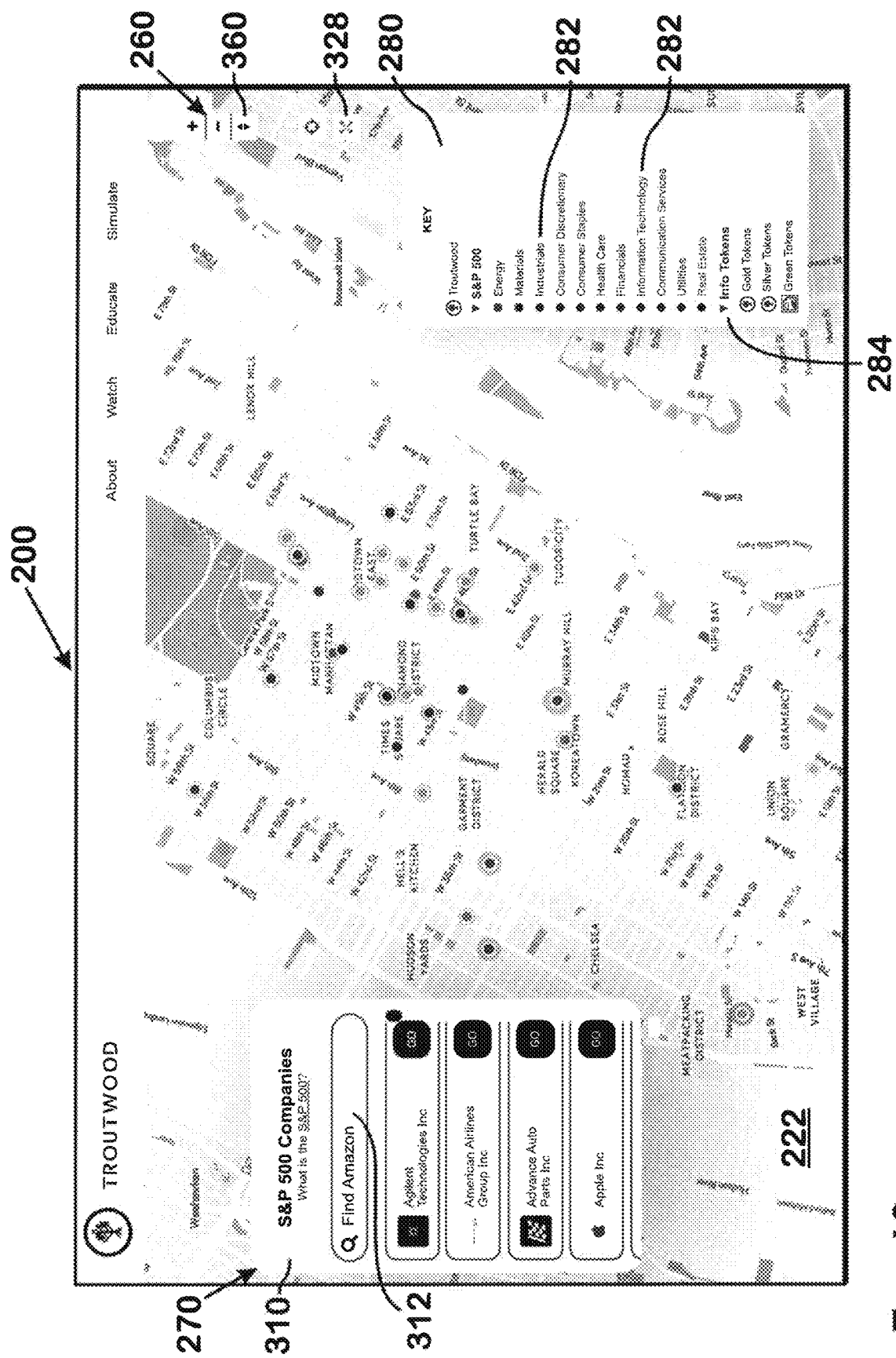
FIG. 16 is another screen shot of the user interface for an interactive map display system according to the invention showing a representative map as rendered in large scale presenting a relatively small field of view, on a display of a computing device, and having a key panel, and search panel.

A search panel 310 is also depicted, with a text entry panel 312, and having a listing of entities, which may be scrolled up or down, with location within the list represented by the scroll bar indicator 316, as can be seen with reference to FIG. 16. In an embodiment, the secondary icon elements 202b depicted vary in color (green or red), and partial radius, as previously discussed. It is anticipated that the secondary icon elements 202b need not be limited to the embodiment depicted, but may instead be any of the alternative embodiments described herein, or any suitable embodiment that may reasonably convey the information of relative magnitude of change and/or direction.

As shown in FIG. 16, the primary icon elements 202a may be colored or otherwise indicate the sector, corresponding to the key panel 280. Selection of exemplary icons are discussed with reference to FIGS. 12 and 13.

With reference to FIG. 12, the interactive map display 200 provides various icons 202 and one selected icon 202', the icon 202 having secondary icon element 202b with a relatively larger partial radius indicating a large percentage change in the value represented by the secondary icon element 202b. As depicted, the icon 202' is a company in the S&P 500, specifically the Waters Corporation is selected. The primary icon element 202a is colored in a color corresponding to the sector for Health Care, as can be seen with reference to the color key depicted in the key panel. The secondary icon element 202b is colored green, indicating the share price has increased. Further selection of the icon 202' (e.g. by clicking the mouse button, or double tapping with a stylus, or any other suitable gesture or action) causes the system 100 to display an additional information panel 206, as shown. As shown in the additional information panel 206 for the Waters Corp., there is indicated a 16.6% increase in the share price, as the current value. This may change as the stock price may fluctuate through the day, until market close. The additional information panel 206 can also be seen to provide information including the title of the company, or other object or entity represented by the primary icon, and further may provide one or more of a logo, the sector, the current stock price, along with relative change in the stock price in actual value change, as well as indicate percentage change. Additionally, the rank for the corporation within the S&P 500 listing is provided, along with a paragraph or fun fact describing an aspect or information associated with the company, entity, or object represented by the icon selected. The information panel 206 may be generated or caused to be displayed by an information module. The information panel 206 may provide a link or selectable button 214 to display the fact sheet, or further detail information, which may be selected by the user, which will be discussed with reference to FIG. 13. Alternatively, it is contemplated that the content within the additional information panel 206 may be user selectable or customizable, such that the user can opt to have the system display within that panel at least one of the summary information for the primary icon element 202a subject as depicted, or a performance graph (depicting performance over time), a relevant news feed, financial details, video content relevant to the primary icon, press releases, links to SEC filings, and/or social media or community discussion links. The additional information panel 206 in this manner may be user customizable, such that one or more categories or types of information can be selected by the user to be displayed within the panel.

With reference to FIG. 14, selection of the fact sheet button 214 from the additional information panel 206 may cause the web browser to open an additional tab or cause the software to display upon the screen detail or information sheet relating to the object or company represented by the primary icon being reviewed. In this instance, selection of the fact sheet button 214 for Waters, as depicted on FIG. 12, will bring up in the browser a new tab, with a fact sheet, for example, as depicted in FIG. 13, providing additional information about the selected icon 202. This fact sheet may provide name of the company or doing business as name, formal entity name, the logo, and motto or trademark or service mark for the company, mission statement, ranking within the S&P 500 listing, and additional company information, such as the number of employees, the location of the company headquarters, a summary of the company's products and services, a short descriptor for the company, and a statement provided by the company regarding community engagement, or any topic of information the company may wish to provide. The fact sheet may include a pictorial representation for the company, as depicted here, the picture is a laboratory setting, indicative of the nature of the industry in which the company participates.

With reference to FIG. 14, the interactive map 200 is provided having a different selected icon 202", in this instance, the icon 202 having a secondary icon element 202*b* with a relatively smaller partial radius indicating a smaller percentage change in the value represented by the secondary icon element 202*b*. As depicted, the icon 202" selected is a company in the S&P 500, specifically the Raytheon Corp. is selected. The primary icon element 202*a* is colored in a color corresponding to the sector for Industrials, as can be seen with reference to the color key depicted in the key panel 280. The secondary icon element 202*b* is colored red, indicating a decrease in share price. Selection of the icon 202 causes the system to display an additional information panel 206. As shown in the additional information panel 206 for the Raytheon Corp., there is indicated a 1.23% decrease in the share price, as the current value. This may change as the stock price may fluctuate through the day, until market close. The additional information panel 206 as shown also includes the title of the company, or other object or entity represented by the primary icon element 202*a*, and further may provide one or more of a logo, the sector, the current stock price, along with relative change in the stock price in actual value change, as well as indicate percentage change. Additionally, the rank for the corporation within the S&P 500 listing is provided, along with a paragraph or fun fact describing an aspect or information associated with the company, entity, or object represented by the selected icon 202". The information panel 206 may provide a link or selectable button 214 to a fact sheet, or further detail information, which may be selected by the user, which will be discussed with reference to FIG. 15.

With reference to FIG. 15, selection of the fact sheet button 214 from the additional information panel 206 may cause the web browser to open an additional tab or cause the software to display upon the screen detail or information sheet relating to the object or company represented by the primary icon being reviewed. In this instance, selection of the fact sheet for Raytheon, as depicted on FIG. 14, will bring up in the browser a new tab, with a fact sheet, providing additional information about the primary icon element 202*a* of the selected icon 202". This fact sheet may provide name of the company or doing business as name, formal entity name, the logo, and motto or trademark or service mark for the company, mission statement, ranking within the S&P 500 listing, and additional company information, such as the number of employees, the location of the company headquarters, a summary of the company's products and services, a short descriptor for the company, and a statement provided by the company regarding community engagement, or any topic of information the company may wish to provide. The fact sheet may include a pictorial representation for the company, as depicted here, the picture is a satellite in orbit, indicative of the nature of the industry in which the company participates.

In any of the embodiments, the fact sheet that is caused to be displayed by the user selecting one of the icons 202 on the interactive map 200 may, in addition to static information and updated performance statistics, may provide for video content to play on a portion of the fact sheet or in the additional information panel 206. Such video content may be relevant video clips for the selected icon, such as news shorts, video highlights, advertisements, or informative videos about the selected icon. The video may be provided by the entity represented by the icon, for example, where the icon is a company or sports team, the video content may be provided by the company or sports team. Furthermore, within the fact sheet, the interactive map 200 provider may provide an opportunity for the entity represented by the icon 202, or other interested parties, to purchase advertising space on the fact sheet or additional information panel 206. For example, the represented entity may opt to purchase ad space on the fact sheet, such that when a user selects the icon 202 for that entity, a portion of the fact sheet may be caused to display an advertisement for that entity. It is further contemplated that another interested party may be wish to advertise when the icon 202 of a different entity, for example a competitor or vertically adjacent business is selected. Thus, in an embodiment, the advertising displayed may be for the same, or alternatively, for a different entity than that entity represented by the icon 202 that is selected on the interactive map 200. For example, a company may purchase advertising that is displayed when that particular company's icon is selected, and/or the icon for one of that company's competitors is selected. The advertisement may be one or more of static displays, video displays, or audio advertising. Furthermore, within the advertising space may be a user selectable portion, button, or weblink that directs the user to a website associated with the advertiser, or to any site dictated by the advertising entity.

As has been previously described, each icon 202 on the map display 200 may represent a unique data object, with its own associated data sets, such as stock performance, financial metrics, company descriptions, sports statistics, etc. A non-limiting list of examples is provided in the listing of Table 1. The invention seeks to enable users to view both data visualization on a geographic map and also enable users to access data through other methods such as screening tools for list and table-based data consumption. One such alternative mechanism is through an information module, configured to provide additional information to the user through an additional information panel. In an embodiment, additional information panel 206 for the information module may be the example of a "company profile", which the user may access by left-clicking on a map icon 202. The information module will then generate the additional information panel, using specific information retrieved from the database, using the unique identifier to locate the appropriate records within the database.

The company profile may provide a dashboard-style interface, wherein a user may control what information is displayed within the displayed panel by using various buttons such as "Profile", "Stats", "News", "Careers", "Internships", etc.

When a user engages the company profile by the previously described action, data (such as "About" company description) is called from the database to populate the dashboard-style information panel and caused to be displayed on the user's device.

The dashboard-style information panel also may permit the inclusion of any information that may be relevant, and for example, may include embedded video links or audio content, that can be selected or automatically displayed within and/or on a portion of the additional information panel 206.

Alternative Secondary Icon Element Embodiments

It is contemplated that alternative depictions of the secondary icon element 202b are possible, so long as the depiction imparts to the user the visual indication of the near-real time data that is to be reflected in the secondary icon element 202b. Alternative depiction of the secondary icon element 202b, for example, could include a depiction of a column or bar placed in proximity to the primary icon element 202a on the interactive map 200 display, where the bar or column depiction is similar to that of a health bar employed in video games, with the secondary icon element 202b displayed as a columns or bar that may be varied in attributes, such as color, opacity, and length, or proportion of the length of the bar or columns that is colored, in order to provide the user a visual indicator reflective of the near real-time data point being studied. For example, where the secondary icon element 202b is a bar, and is to reflect stock market performance reflected through share price, the color of the health bar may be varied between colors, such as green to indicate positive share price change, or red, to reflect negative share price change, with the magnitude of the change in absolute value, or percentage change, reflected in the length of the health bar that is colored in, such that a large change, or relative change, would fill in more of the health bar than would a smaller change, or smaller relative change. Similarly, the bar of the secondary icon element 202b may be curved and at least partially encircle primary icon element 202a, such that the secondary icon element 202b appears similar to a pie chart, only with the center of the pie chart occupied by the primary icon element 202a. It is contemplated that in this, or any other depiction of the secondary icon element 202b, the secondary icon element 202b may be depicted as appearing to rise in a height dimension, when viewed from a perspective other than directly overhead, relative to the plane of the interactive map 200 depiction, thus appearing as a pseudo-3 dimensional representation on the interactive map 200, where greater magnitude of change appears to be dimensionally greater in height than the depiction for a smaller magnitude of change, again, with the direction of change represented by the color.

Alternatively, the secondary icon element 202b may simply be a depiction of the numerical value adjacent to the primary icon element 202a it refers to, with the direction of change indicated by the color, as previously described, and/or may optionally include a negative sign to indicate a negative direction of change. It is further contemplated that to aid visual sorting for the user, the magnitude of change may be reflected in the displayed numerical value, and may be further emphasized by the font size used for the secondary icon element 202b, such that a relatively large increase or decrease would be highlighted for the viewer in the larger character size used to display the numerical value, compared to the character size used to display a smaller to no value change.

In the case where the interactive map 200 displays financial performance data for the stock market, the secondary icon element 202b may reflect, as non-limiting examples, any of market capitalization, price change for a defined period, revenue, net income, price to earnings ratio (P/E ratio), cash on hand, debt, number of employees, or reflect any suitable combination of factors, such as displaying the ratio of cash to debt, or the ratio of revenue per number of employees.

In an embodiment, the secondary icon element 202b could represent a value for a variable that is a member of a normalized data set, or alternatively is presented as a differential ratio, when compared to an aggregate index, such as a market index average, or other group average. For example, where the stock market aggregate index performance in a measured variable (e.g. percent price change) is nominally assigned a value, typically 1.0, the individual data point for one entry within the aggregate, or being compared to the aggregate, may be assigned a value relative to the normalized value for the same measured performance, and where the individual data point outperforms the aggregate by 10%, may be depicted as having a value of 1.10. Conversely, where the value of the individual data point underperforms the aggregate value by 25%, it would be depicted as having a value of 0.75. As a detailed example, where a company is a member of the S&P 500 listing, the stock price performance for the company may be presented in a manner that highlights whether the company is outperforming, or lagging behind the aggregate S&P performance. In this instance, where the aggregate S&P performance is normalized to a score of 1.0, and the company outperforms the aggregate S&P performance by 10%, the secondary icon element 202b would indicate or proportionately represent a value of 1.1. In any of the embodiments, there may be a benefit of highlighting those values that are outstanding for one entity, such that they may be easily identified by being compared to a representative group or control group of values, such as a stock market index average, such that better performance or under-performance may be emphasized on the display for easy identification by the viewer. It is contemplated that individual and aggregate performance need not be limited to this example and may alternatively depict the effect of inflation on consumer goods or changes in housing market. For example, a change in value for a house may be compared against an average housing value change in a desired market or group (e.g., a neighborhood, a zip code, a city, a borough), such that the interactive map 200 depiction may highlight for the user those houses that are overperforming or underperforming against the average for the relevant housing market.

In another embodiment, it is contemplated that multiple icons 202 in close proximity may be depicted as a three dimensional stack, with larger data value objects located at the bottom or top of a stack, and the user able to hover over each segment of the stack, retaining the same functionality described elsewhere. The stacking data visualization may be adjusted in scale or as selected by the user.

Figure 17:
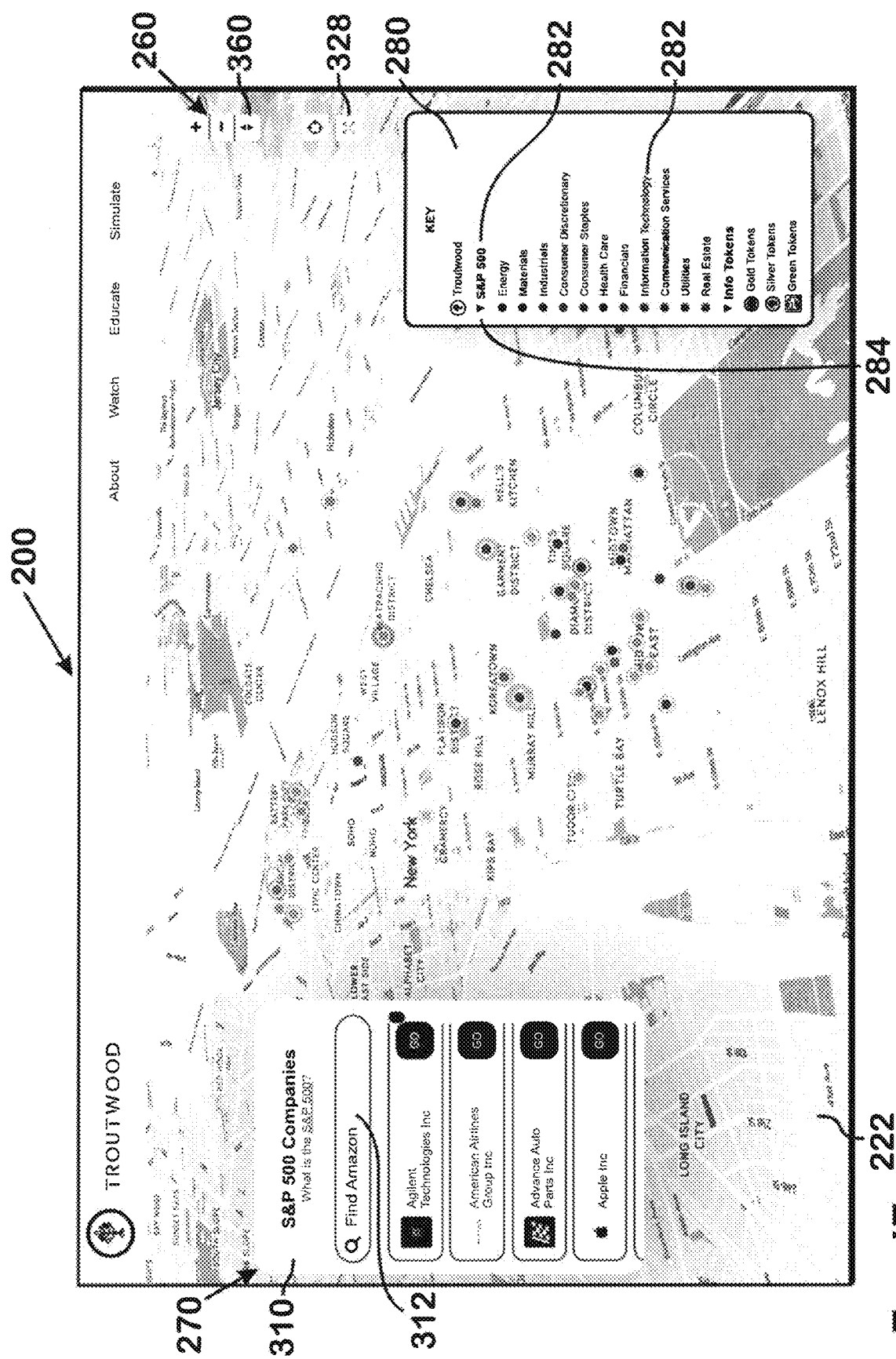
FIG. 17 is another screen shot of the user interface for an interactive map display system according to the invention showing a representative map as rendered on a display of a computing device, depicting a perspective and rotated view.

With reference to FIGS. 16 and 17, the user selectable adjustments to the interactive map 200 view and perspective will be explained. As shown in FIG. 16, the interactive map 200 display depicts an overhead view of the interactive map 200 at a relatively large scale, with city blocks being visible. Multiple icons 202 are depicted within this view, with icon characteristics having been described previously. As shown, the interactive map 200 is oriented with North being in a vertical direction as the default display. The user may manipulate the interactive map 200 through the interface, to adjust the perspective of view, and direction of rotation, so that North is away from vertical.

With reference to FIG. 17, the perspective view has been shifted away from directly overhead, such that the perspective view is at an angle, affording a larger field of view away from the interactive map 200 center. Additionally, the direction of view has been rotated such that the perspective of view is in a generally Southwest direction, with North being oriented down and to the right as one views the image. Selection of the compass button 322 would cause the direction of view to automatically rotate to present North in a vertical direction. The user may manipulate the interactive map 200 to adjust the perspective, either decrease or increase the amount of perspective through the viewing angle. Selection of the default scale button 328 would trigger the interactive map 200 to revert to an overhead default view and scale, as has been discussed.

Figure 18:
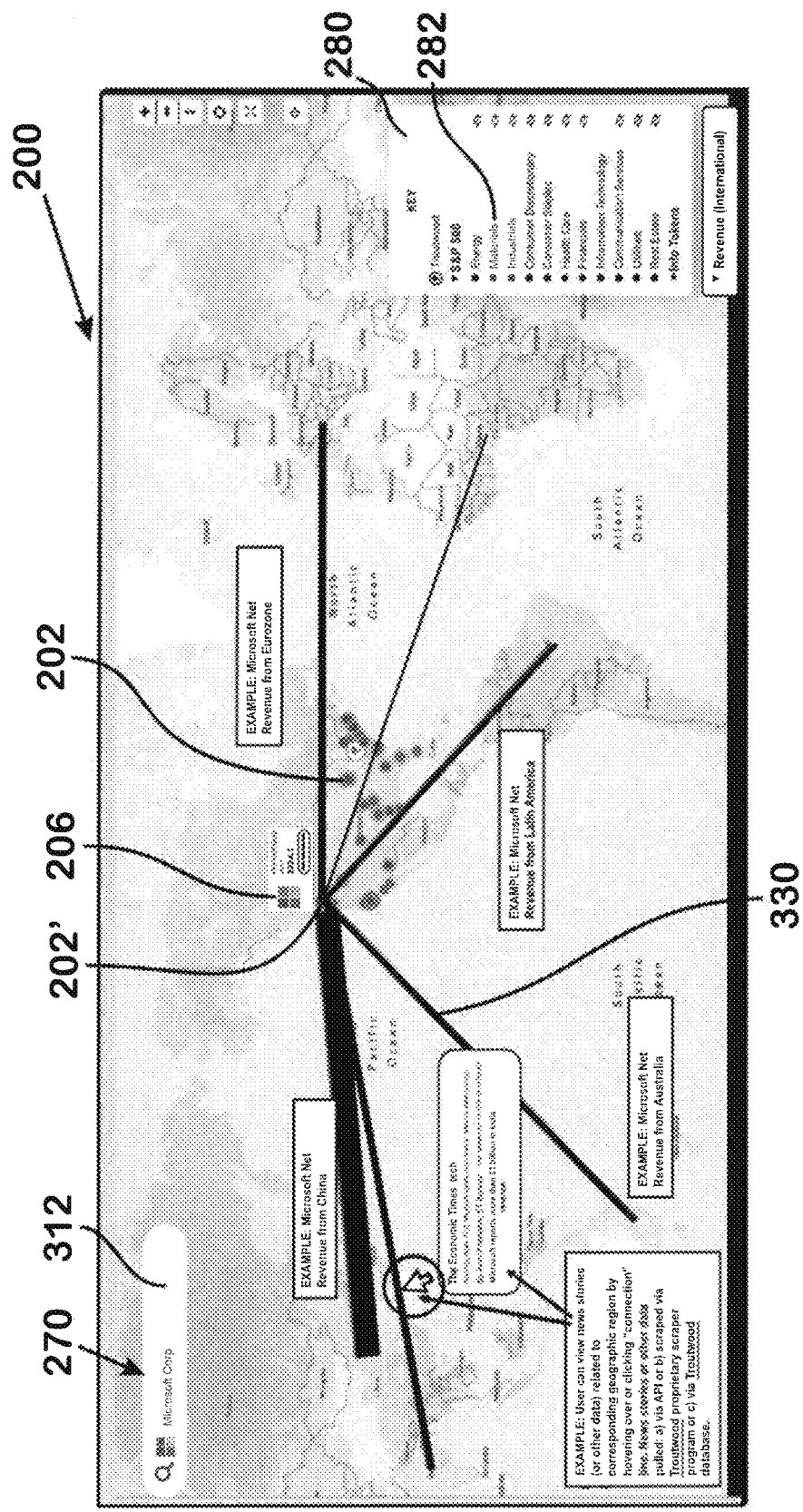
FIG. 18 is a screen shot of the user interface for an interactive map display system according to the invention showing a representative map as rendered on a display, the interactive map 200 having graphically represented connection lines representative of links between primary icon elements.

With reference to FIG. 18, there is depicted an embodiment of the interactive map 200 that depicts connections represented as connecting lines 330 between primary icon elements 202a on the interactive map 200. Such links may be useful in data mining or discovering connections between entities. For the embodiment of FIG. 18, the icons 202 depicted represent companies, and the links depicted as connecting lines 330 represent revenue flowing between connections, though it is contemplated that the connections may represent a variety of factors, for example, the strength or extent of financial ties, debt, or investment relationships between icons on the interactive map 200, or other connections that may be examined, such as connections through suppliers/purchaser relationships, shared suppliers or customers, or connections through references in news articles, as non-limiting examples. One skilled in the art will recognize that various searches or queries could be prepared that result in a display of connections between entities. In an embodiment, the connection is represented graphically on the interactive map 200, such as a line connecting the icons, as depicted in FIG. 17. It is recognized that the connection need not necessarily be a straight line, and may be, for example, a curved or parabolic line between the connected icons 202. The extent of connections can be visually observed, where multiple connections create a "hot spot" on the interactive map 200 as lines begin to overlap each other. The strength of each individual connection, which may be, for example, the monetary value represented through the connection, the % of revenue, value of business to business contracts, or credit extended between entities, as non-limiting examples, may be indicated on the interactive map 200 by varying any one or more of color, opacity, or thickness of the line on the interactive map 200. For example, where the color or shade is varied, the intensity of the shade, or the color may be represented on a scale provided on the interactive map 200, and thereby indicate the extent of the connection. On the displayed map, there may be provided a key to indicate the nature of the connection being displayed. It is contemplated that the user may be able to bring up a menu panel or otherwise choose what sort of connections lines 330 are to be displayed. The connections may be determined by accessing current or historical information, such as may be gathered through news and reference sources, or at least one application-programming interface (API), or other suitable database sources. The connection depiction information may be collected as a result of the system be caused to run a query of the provided information through a database. Where the user edits the parameters for the displayed connections, the system may in response to new selection parameters run additional queries or reviews of collected information. In an embodiment, multiple queries may be run for a single map, and may resulting in different sets of relationships being displayed on the interactive map 200. In such an instance, the connecting lines 330 for each different set of connections may displayed in a differentiated manner, thereby allowing the user to distinguish one set of connections from the other, such as by being provided with one or more distinguishable characteristics, such as color, opacity, thickness, or style (e.g., solid or dashed, or lines with any combination of dots and dashes).

To aid the user in reviewing connections, the user may hover a cursor over any one of the connection lines 330 on the interactive map 200, and detailed information on that selected connection line 330 may be brought up in an additional information panel. The additional information panel for the connection line 330 may provide, for example, a link to the news article substantiating the connection between entities represented at each end of the connecting line 330, or provide numerical values quantifying and/or demonstrating the nature and extent of the connection. The nature and extent of the connection may be reflected in the map display by altering, for example, the thickness of the connection line 330, for example, a very strong connection may have thick connection line, approximately 50 pixel widths, while a very weak connection, may have proportionally narrower connection line, down to 1 pixel width. The scale utilized for producing the connection line weightings may be based on an absolute scale, indicative of the actual quantitative value utilized for creating the connection line, or alternatively may be a relative scale, and adjusted based on the other connection lines visible on the display or within a selected subset. In an embodiment, should the user wish to narrow down the number of connections on the interactive map 200, the act of hovering over, or selecting one of primary icons on the interactive map 200 may cause the relevant connections to be featured for review, for example, the connections for that selected primary icon element 202a may flash, or alternatively, lines for other entities not connecting to the selected icon 202 may be muted, dimmed, rendered translucent, or disappear entirely, so long as that icon 202 remains selected, or hovered over.

Connections between primary icon elements 202a representative of objects, or entities may be rendered by obtaining the geographic coordinates of two or more primary icon elements from the database, then rendering graphical connections on the display, such graphical connection lines may be, for example a straight line, parabola. In an embodiment, the lines may be routed to more clearly depict the relationship clearly.

As a non-limiting exemplary embodiment, the database may contain information for an entity, such as Microsoft (MSFT), with a column in the database indicating other companies or ticker symbols involved in MSFT related news stories over the past 7 days. Those companies could be, for example, Toyota™ and IBM. If the user choose to "visualize news connections" and "last 7 days" that column of the database, containing TM and IBM, would be associated with the geocoordinates of those companies, enabling the software application to render the visual connection between all three companies on the map interface. Additional columns with data within the database could measure the number of news mentions or other quantitative data which may be used to measure strength or magnitude of various data relationships, and may be utilized in the creation of connection lines 330 on the display.

The user could further "hover" over the straight line or parabola, etc. visual depiction of a connection and, using the same method previously described, view an additional panel (or hover panel) displaying the text of the news article or link, thumbnail, etc., with which the user could then interact.

The application of connection lines on the display need not be limited to news connections between companies, and may also include visualization of connections such as revenue, debt, social media mentions, and so on. One skilled in the art could similarly recognize that sports statistics, or any other varied nature of collected information may similarly be depicted on the map display. The thickness, color, or intensity of a visually rendered connection (or connections) may be governed by an algorithm or algorithms (housed in either the database or on the front end) evaluating quantitative factors of the relationship, such as number of news mentions, percentage of revenue, etc., the values of which could be contained in the database as previously described. For example, a company featured in 1,000 news articles in the past 7 days could have a much larger and more intense visual representation than a company with two news mentions during the same period. Similarly, a company with greater sales to a second company would have a more intense visual representation than it would to a third company if it had lower sales to the third company.

Trip Module

In an alternative embodiment, the system may provide an option for a road trip mode, using a trip module, where the system may utilize location services, such as is available on mobile phones, to determine the current location of the user, and prompt the user when in proximity to a primary icon element 202a on the interactive map 200. The user in this manner can be prompted to review the information for that primary icon, and allow the user to explore the information associated with the represented entity or item, as the user travels.

In another embodiment, the icon represents the location on the interactive map 200 of a sports team, or participant in a sporting event, and the digitally rendered map can display information relevant to, for example, sporting odds, rank, current score of the sporting event, or other aspect of performance information. Such information can be displayed by hovering the cursor over the selected icon. Alternatively, details on the icon may be brought up in an additional panel that is rendered on the display upon selection of the icon. Furthermore, selection of the trigger button on the display, such as may be provided through a "buy it now" button, may initiate the placement of a wager, or the process for completing a wager, on the outcome of an ongoing, or upcoming sporting event for the selected icon. Within the interactive map 200, selection of a team icon, or hovering the cursor over the icon on the interactive map 200, would bring up the additional information panel, which may include interesting aspects related to the selected team or participant, for example, player details, links to individual performance data, links to other sporting teams at the same location as may occur at a collegiate level competing in a variety of sports. It is contemplated that the triggered purchase, or wager, may be immediately placed, where the user has been pre-approved, or has created a background profile within the system that includes payment authorization or an authorization to access electronically a source of funds through or within the system.

Similar to the "Buy Local" functionality described previously, the trip module would rely upon GPS location data transmitted from a user device interacting with location data for various objects of potential user interest stored within the database.

For example, if a user with GPS location services enabled and the application moves within a defined distance of a database object, an algorithmic trigger may be activated, causing the user to receive notification via SMS or similar push notification service.

The invention requires recurring communication between the user's device and the backend or a locally stored list of the relevant location data objects, potentially housed on the user device.

In another exemplary embodiment, where the aim of the system is to advance the education of the user researching the entities, there may beneficially be included within the additional information panel 206 links to job descriptors associated with such an organization. For example, research a technology company, or alternatively, an energy company, as non-limiting examples, may bring up links within the additional information panel to explore career paths in the technology sector, or energy sector, respectively. Alternatively, there may be provided a link to current job openings or internship opportunities within the selected organization.

It is further contemplated that any embodiment of the interactive map described herein may be configured to display any variety of information that would be expected to have at least one set of rapidly changing or revised data that could be displayed through a secondary icon element 202b, where each of the rapidly changing data are associated with an infrequently changed, or even permanent, data set that could be displayed through a primary icon element 202a. In addition to the previously provided examples of rapidly updated financial performance for corporate entities, and team performance or wagering odds for sports teams' activities, other, potential displays include: sports performance tracking, not necessarily related to sports betting, such as team or individual performance data could be tracked, and keyed to locations on the interactive map 200 display. In this manner, high school team performance or rankings within their state or conference could be viewed. The icon may reflect an individual's sports performance, such as tracking an improvement in their time, or scoring performance.

Examples include, such as where the individual being tracked is participating in sport or competitive event, for example golf, the primary icon element 202a may reflect the location of the event, such as may be a golf course, and the secondary icon element 202b may reflect their performance, whether in a measured value, for example the absolute score, or and adjusted value, such as the score incorporating the player's handicap statistic. Alternatively, where the individual is participating in competitive swimming, or track events, the primary icon element 202a may reflect the location of the even in which the individual participated, and the secondary icon element 202b reflect an aspect of the individual's performance, such as time, or improvement time for the event, or other measurement of performance.

In an embodiment of the interactive map 200 that is depicting varying data in the secondary icon element 202b, where the data flow has periodic pauses, such as stock market information, or sporting odds, the secondary icon element 202b, or portion of the display, may indicate to the user that the displayed information is the most recently available data generated and available electronically, prior to the pause, and furthermore may provide indication to the user that the flow of updated information reflects dated information, and optionally provide an indication when new information updates are expected. For example, it is contemplated that where the market or sports betting window is closed, the secondary icon element 202b may display the most recent data set published. Furthermore, in the case of financial market information to be displayed on the interactive map 200, and while the market is closed, e.g., over a weekend or market holiday, the interactive map 200 would display the financial data for the most recent market close, and would be update once the market is open. Alternatively, the interactive map 200 may have an option display market futures data, if so selected by the user. Similarly, where the interactive map 200 is to display sports betting information, the display may depict the latest odds on the sporting event, prior to the close of the betting window on such a sporting event.

The nature and categories of information that can be displayed on the interactive map 200 is wide ranging, and can be adapted to any sort of category a user may wish to explore where there is a type of information that is relatively static, or infrequently changed, and another type of information that is more frequently updated. Non-limiting examples of the information categories that may be utilized in producing primary and secondary icons on the embodiments of the interactive map 200 according the teachings herein can be seen with reference to Table 1.

Table 1
   Financial information
   Company Valuation
   Profile Minute
   Quote Real-time
   Key Executives
   Search Real-time
   Financials ZIP
   Financial Statements Annual/Quarter
   Financial Statements List New
   Financial Statements Growth Annual
   International Filings Annual/Quarter
   Financial Statements As Reported
   Financial Ratios Annual/Quarter
   Enterprise Value Annual/Quarter
   Key Metrics Annual/Quarter
   Financial Growth Annual/Quarter
   Rating Daily
   DCF Real-time
   Market Capitalization Daily
   Symbols List High Usage
   Batch Request High Usage
   Stock Screener
   Delisted Companies
   Stock News Popular
   Earnings Surprises New
   SEC Filings New
   Press Releases New
   Calendars
   Earnings Calendar Popular
   IPO Calendar
   Stock Split Calendar
   Dividend Calendar
   Economic Calendar New
   Institutional Fund
   Institutional Holders
   Mutual Fund Holders
   ETF Holders Popular
   ETF Sector Weightings
   ETF Country Weightings
   SEC RSS Feeds Real-time
   Form 13F
   Stock Time Series
   Price Real-time
   Historical Price 1/5/15/30 min/1 hr/Daily
   Historical Dividends Daily
   Historical Stock Splits Daily
   Technical Indicators
   Daily Indicators New
   Intraday Indicators New
   Market Indexes
   Majors Indexes Real-time
   List of S&P 500 companies
   Historical S&P 500 Daily
   List of Nasdaq 100 companies New
   Historical Nasdaq 100 Daily
   List of Dow Jones companies New
   Historical Dow Jones Daily
   Historical Stock Index prices 1/5/15 min
   Commodities
   Prices Real-time
   Historical commodities prices 1/5/15 min
   ETF
   Prices Real-time
   Historical ETF prices 1/5/15 min
   Mutual Funds
   Prices Real-time
   Historical Mutual Funds prices 1/5/15 min
   EuroNext
   Prices Real-time
   Historical EuroNext prices 1/5/15 min
   TSX
   Prices 1 Min
   Historical TSX prices 1/5/15 min
   Stock Market
   Most Active Daily
   Most Gainer Daily
   Most Loser Daily
   NYSE Trading Hours
   Sectors Performance Daily
   Cryptocurrencies
   Price Real-time
   Historical Crypto Quote 1/5/15 min
   Forex (FX)
   Price Real-time
   Historical Forex Quote 1/5/15 min
   Sports information for any sport and level for which data is collected and may be available (including professional, semi-professional, collegiate, high school, amateur)
   Teams
   Conferences
   Schedules
   Odds/Wagering lines/Prop Bets/point spread, over/under
   Stadium information
   Standings
   AP Rankings
   Player Cards
   Current Scores
   Team Statistics
   Player Statistics
   Fantasy Points
   Final Scores
   Player Game Statistics
   Team Game Statistics
   Player Season Statistics
   Team Season Statistics
   Historical Sports data/team data While the interactive map 200 contemplated herein have been described in the context of financial aspects and sports information, it is recognized that the subject material to be displayed on the interactive map 200 may vary widely, and can rely on any suitable source of data, such as an application-programming interface, that serves to provide ready access to collected information. In this manner, the systems taught herein can display a map that is able to identify the location of the primary icon element 202a representing a static information, i.e., a static data point, such as an object, entity, or event, depicted on the interactive map 200, and further displays a representation of tracked or statistical information that is updated at a higher frequency than that of the primary icon element data, and would be represented on the interactive map 200 as the secondary icon element 202b, as illustrated in FIG. 9.

Figure 19:
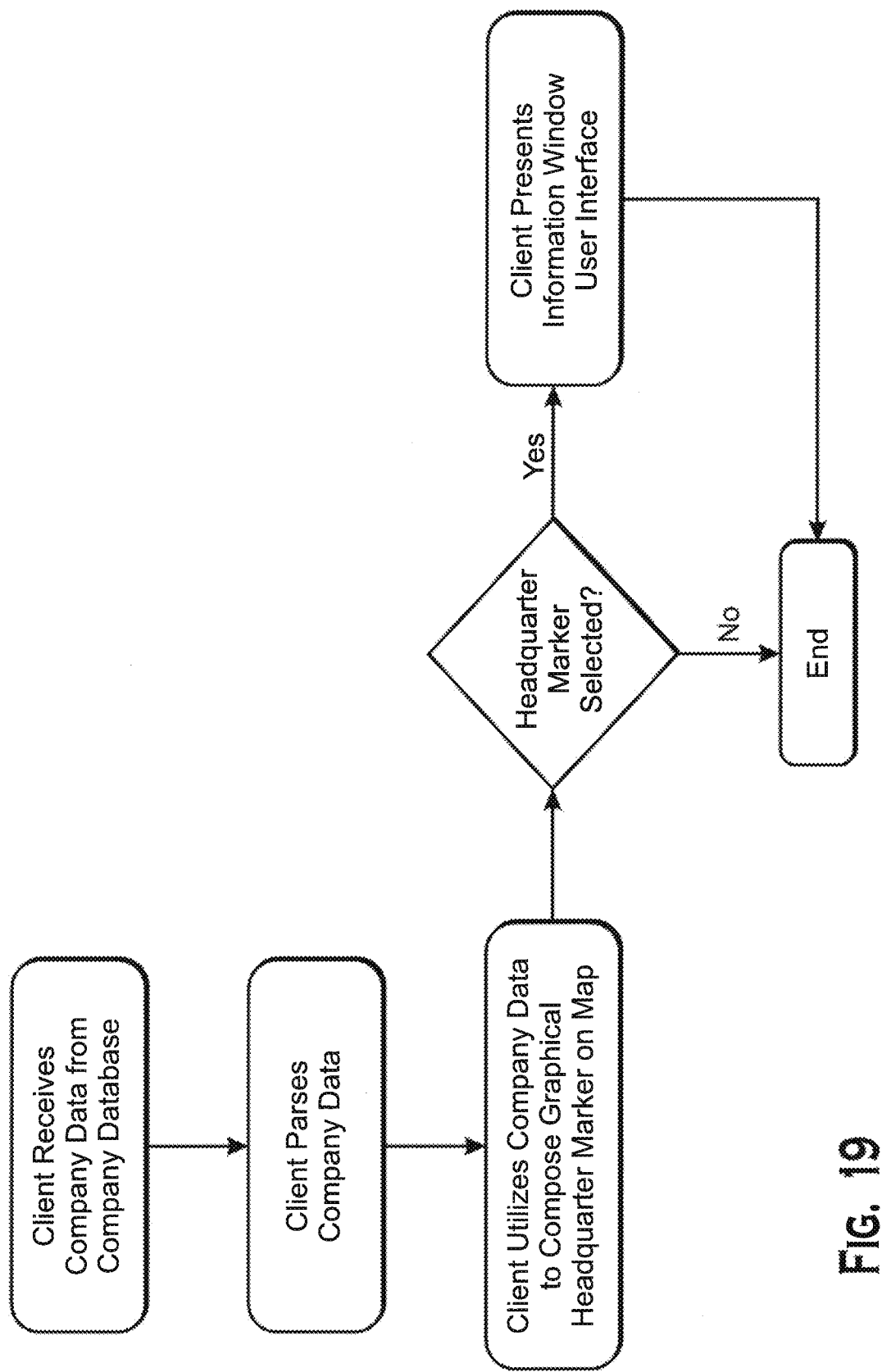
FIG. 19 is a flow diagram depicting in an embodiment, the transmission of company data to the client and presentation of an information window upon selection of an icon, according to an exemplary embodiment of the invention.

Now with reference to FIG. 19, there is depicted the flow of entity data as the user navigates the interactive map 200 display. In this instance, for example, company data is depicted; though it is contemplated, any entity or individual that is to be the subject of the interactive map 200 display may be presented similarly. The company data is accessed or received the company database, and optionally, the client parses the company data, and the system composes a graphical representation, such as an icon indicative of the location or headquarters of the company to be presented on the interactive map 200. As part of navigating the interactive map 200, the user may select one of the icons on the interactive map 200, which in turn, causes the appearance of the additional information window to be rendered on the interactive map 200 display. If no icon is selected, the system reverts to waiting for an icon to be selected, as the user navigates the interactive map 200 through the interface.

Figure 20:
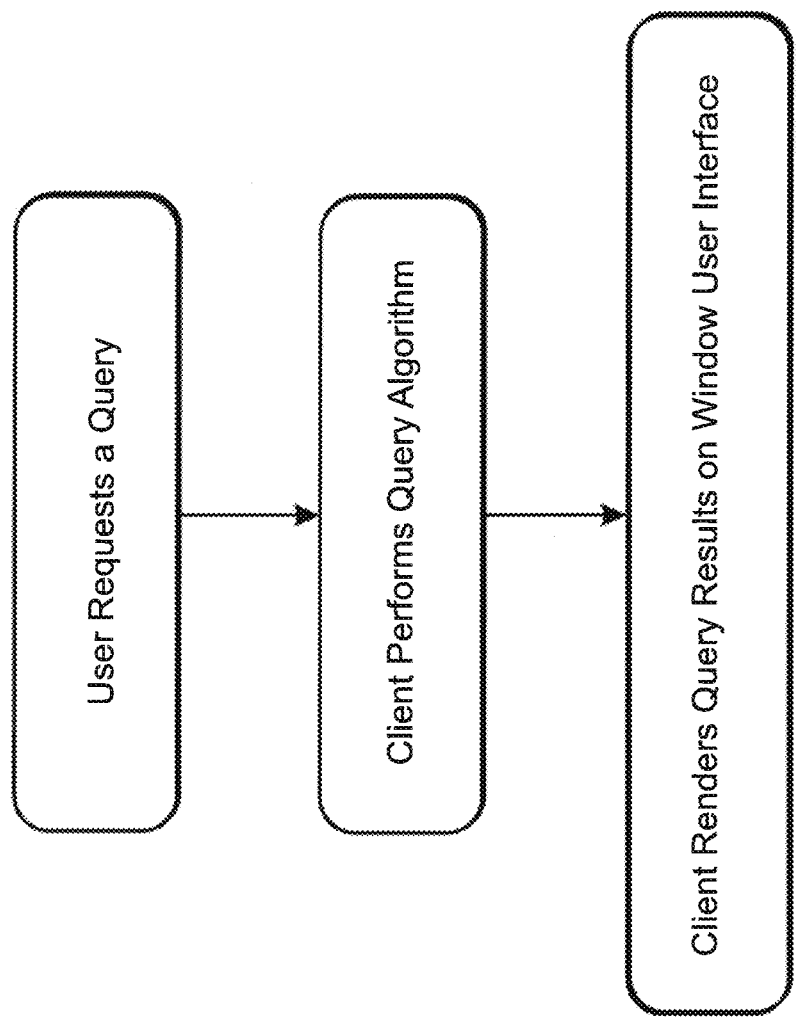
FIG. 20 is a flow diagram depicting in an embodiment, the steps for performing a search query, according to an exemplary embodiment of the invention.

Now with reference to FIG. 20, there is depicted a flow chart, applicable where a user enters a search query in the search panel of FIG. 12. In this instance, rather than the user navigate the interactive map 200 through the interface, the user types an entry, or portion of an entry, such as a company name, into the search panel. Alternatively, the user may elect to search for a category, or enter a partial name of a category of entities to render upon the interactive map 200. It is contemplated that the system, rather than depict the search result on the interactive map 200 display, may instead present a list of results from which the user may select one or more of the results to be rendered on the interactive map 200 display. As depicted, the user would submit a search string for which a query would be performed, utilizing a keyboard, or touchscreen, or other method of navigating the user interface. It is also contemplated that speech to text may be implemented, where an orally given command is translated by the processor into text, and the resultant text is populated into the search panel. After confirmation by the user of the processed search instruction, the search is presented as a query to the system. The client would receive the query algorithm and render results to the query on the windows user interface.

Figure 21:
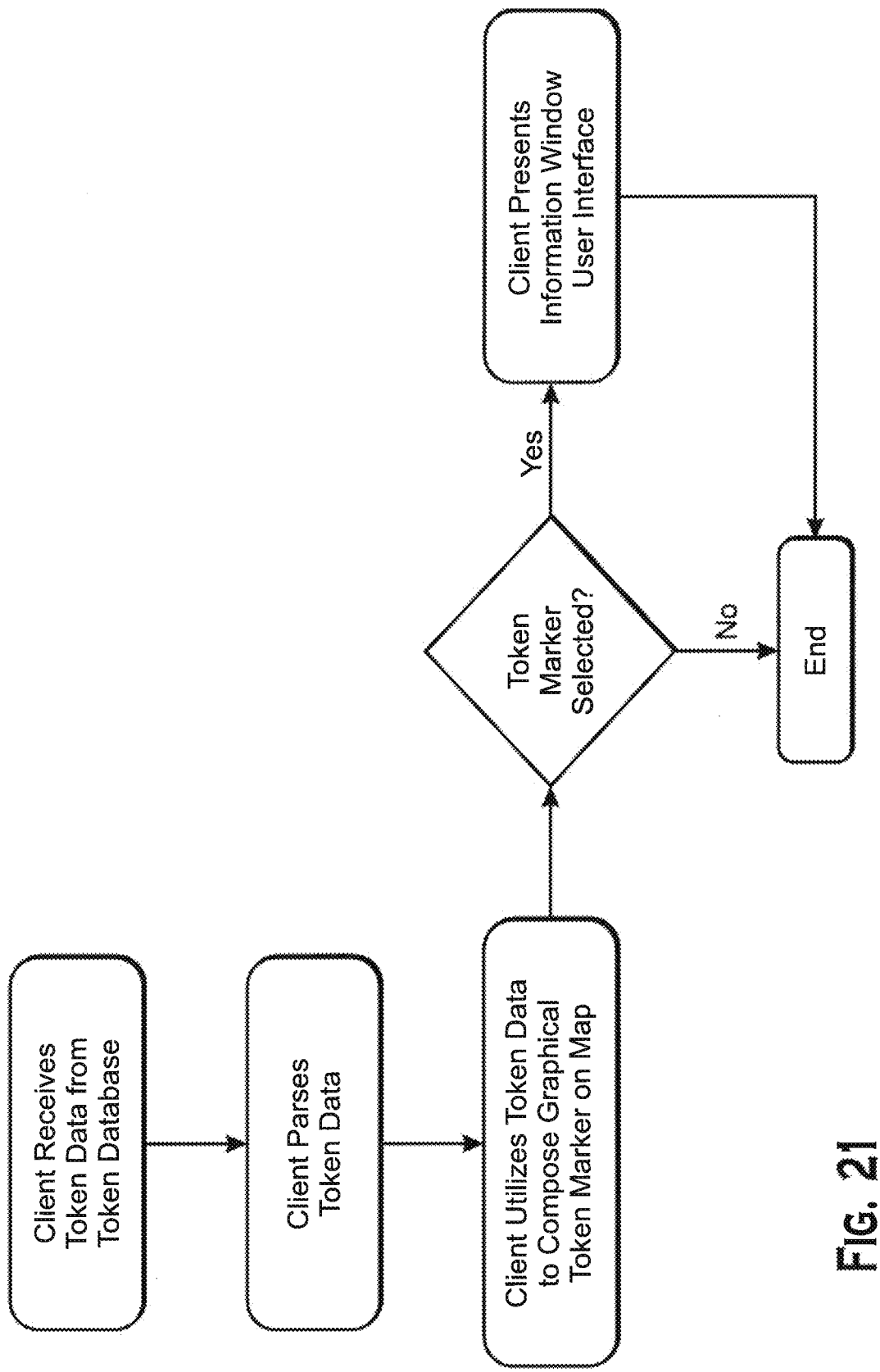
FIG. 21 is a flow diagram depicting in an embodiment, the transmission of information token data to the client and presentation of an information window upon selection of a token icon, according to an exemplary embodiment of the invention.

Now with reference to FIG. 21, there is depicted the flow for transmitting token data to the client, and composing token markers, and the information to be displayed within the additional information panel of FIG. 8, when a token is selected on the interactive map 200 display. As shown, the client receives token data from a token database, which may be prepared by Troutwood, and optionally, the client then parses the token data, and utilizes the token data to compose a graphical token representation on the interactive map 200 by preparing an icon for inclusion on the interactive map 200 display. Subsequently, as the user navigates the interactive map 200, if a token marker is selected using the interface; the information for that token marker is caused to be presented in the additional information panel of FIG. 12.

Figure 22:
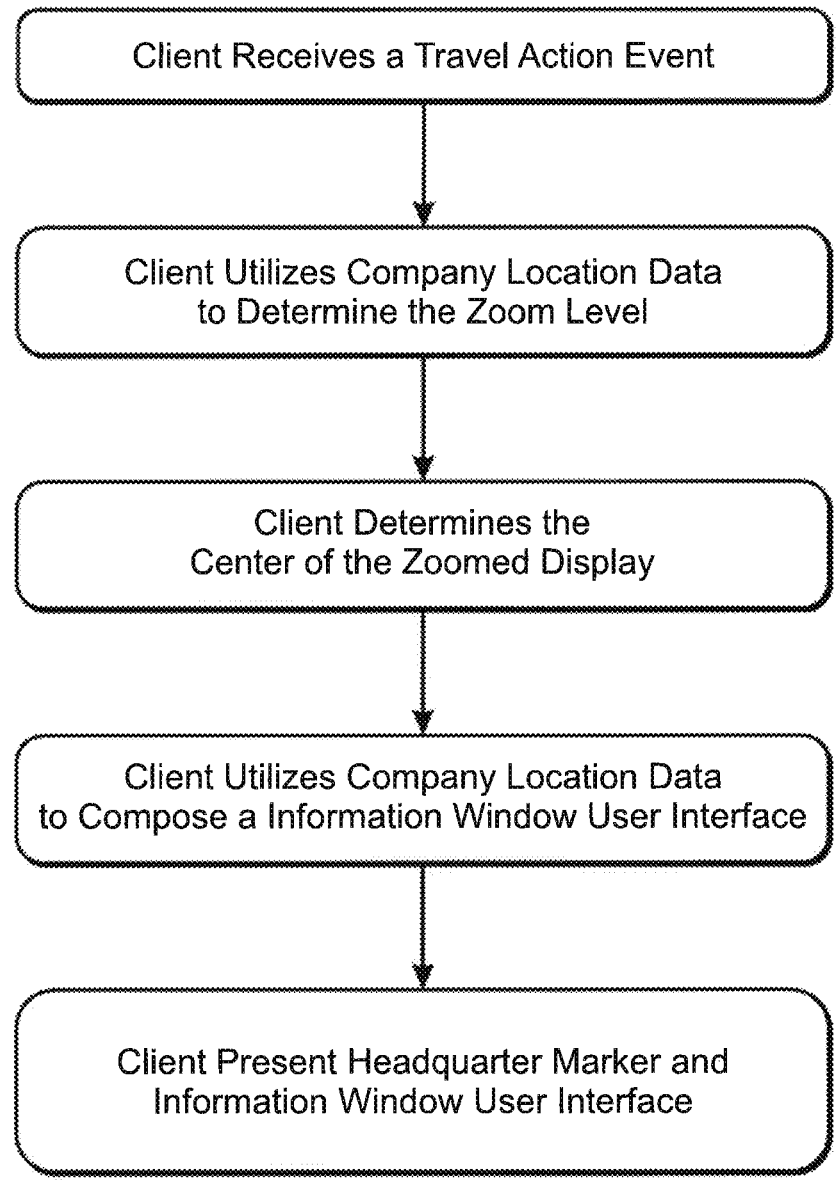
FIG. 22 is a flow diagram depicting in an embodiment, the navigation, movement and zoom movement of the displayed portion of the map, according to an exemplary embodiment of the invention.

Now with reference to FIG. 22, there is depicted the flow of actions as the user navigates the interactive map 200 display through the interface. The user may initiate a travel action event in any suitable manner, such as calling for a different level of zoom, or selecting a new center for the interactive map 200, or rotating the interactive map 200 on the display. Additionally, a travel action event, resulting in travel of the display map center within the interactive map 200 view can be accomplished by dragging a portion of the interactive map 200 in the direction that travel is desired, or navigating to adjust the interactive map 200 display contents using directional keys or buttons. The user, through the interface, causes an instruction to be sent to the system, or to the client's system, to initiate a travel event. The client then utilizes company location data to determine the zoom level, and determines the updated center of the zoomed display. The client then utilizes information from the company database, such as the company location data, to compose an information window user interface, which may be presented to the user's display map. In this manner, the movement or travel request on the interactive map 200 display submitted by a user would result in an updated map display presenting the revised icon locations superimposed upon the revised map dimensions.

Figure 23:
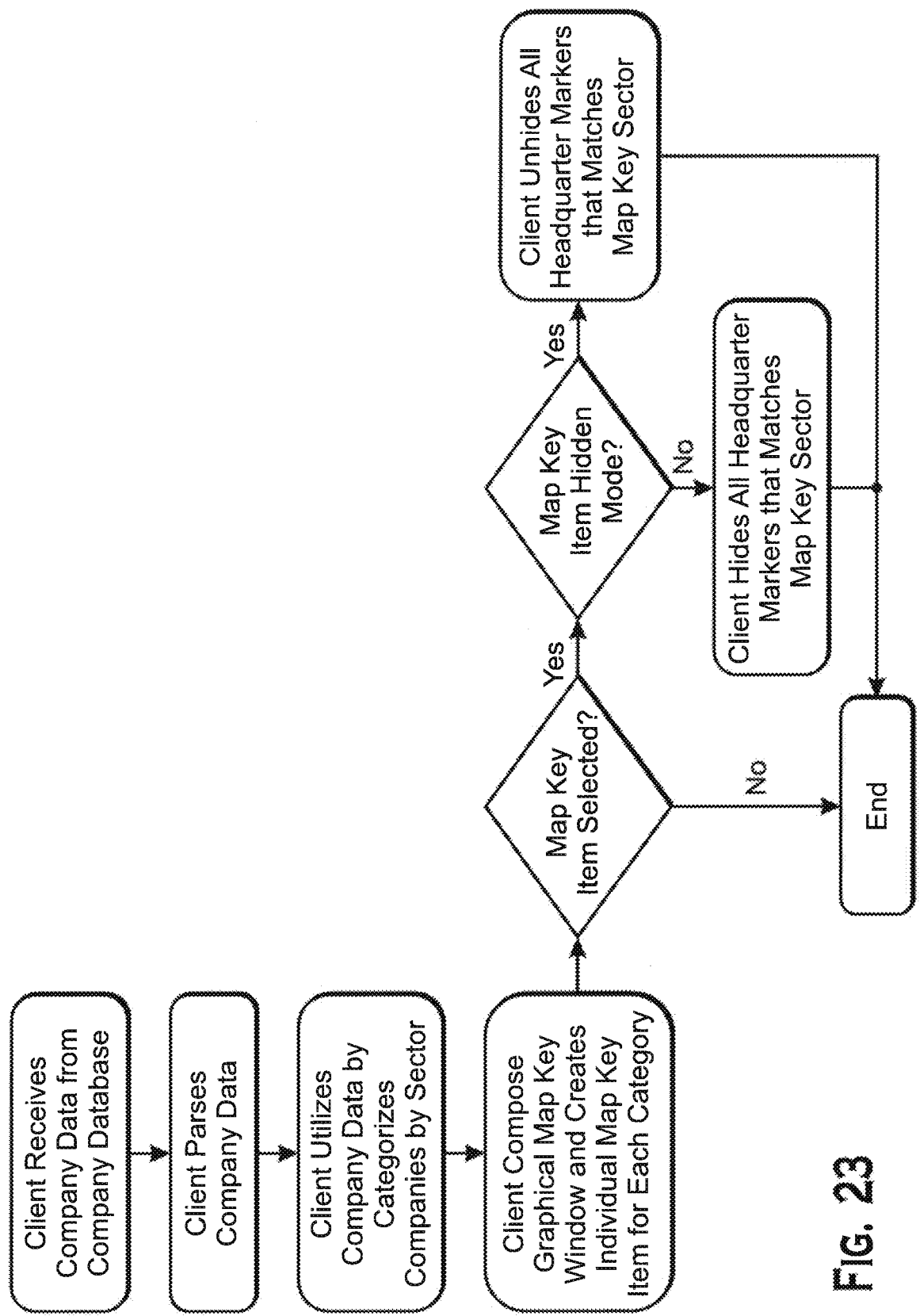
FIG. 23 is a flow diagram depicting in an embodiment, the categorization and filtering of the display of icons on the map, according to an exemplary embodiment of the invention.

Now with reference to FIG. 23, there is depicted the flow for the user to apply filters to the categories of icons to be displayed upon the interactive map 200. As shown, in an embodiment, the client receives company data from the company database, and the client parses the company data. Subsequently, the client, utilizing company data from the company database assigns each company by category. In the depicted embodiment, where the subjects being displayed are company entities as part of educating the user about financial performance, the categories may represent industrial or technology sectors, into which the companies may be assigned. In alternative embodiments, such as sports teams, the categories for which team entities may be assigned may be, for example, divisions, conferences, categories of sports (e.g., football, soccer, baseball, hockey, track, swimming, etc.). With each potential icon that may be displayed on the interactive map 200 assigned a category, the client then composes a graphical map key window (previously depicted as the key panel of FIG. 8), where each category is assigned a unique identifier (e.g., color, symbol, shape) by which a primary icon element 202a may be identified as falling into one of the categories. As the user then navigates the interactive map 200, or utilizes the interface, the user may toggle each category by selecting the category within the key panel of FIG. 8, allowing the user to select whether to display or hide each category individually. Thus, where the user has selected a map key item, the system will toggle the display to hide, or show on the interactive map 200 display all of the icons that fall under the selected category. Thus, as shown in FIG. 6, where a category is selected by the user, if the category is not hidden already, the client would be caused to hide all of the icons that fall under the specified category, and where the category is already hidden, the client would be caused to unhide all of the primary icon elements 202a that are under that category.

Utilizing the instructions provided in FIGS. 19-23, the user may, through the system, navigate the display, adjust the level of zoom, re-center and re-orient the interactive map 200 display through the interface. The user may search for a particular icon, or category of icons. The user may adjust the categories that are to be displayed, or hidden on the interactive map 200 display. Furthermore, the user may select any of the displayed icons upon the interactive map 200, including information token icons, or any primary icon elements 202a associated with any non-hidden category, and cause the display to bring up the additional information panel for viewing by the user.

It is contemplated that the interactive map 200 may drive education and information dissemination for potential investors, students, or children exploring the interactive map 200. For example, the interactive map 200 as described herein may be used as an educational tool, where the user is able to explore aspects of subjects encountered during a trip, where the user's current position or planner route would bring up any icons in proximity to the user, or in proximity to the route planned by the user. In an embodiment, the icons may represent companies in which the user may invest in the stock market, such as companies in the S&P 500 market. The user may select the icons to explore the information provided within the system. Additionally, the icons on the interactive map 200 may be the information tokens, as discussed previously, which may stimulate interest in exploring the interactive map 200, and the details of information associated with the icons further. In an embodiment, the user may be provided challenges to stimulate interest, where the user is asked to locate icons, and the system may provide hints to the user to assist in the search as the user explores the interactive map 200.

An exemplary method of practicing the teachings herein is described below. In an exemplary embodiment, the hypothetical user of the interactive map display system, utilizing any suitable computing device, such as a computer, mobile phone, tablet, or similar computerized device capable of accessing information from the internet, and may initially go through an end user enablement process.

For the end user enablement process, the user initially accesses the interactive map through a program or application that is in electronic communication with an application database. In an embodiment, the user gains access to an internet web portal by directing the computing device to access the corresponding web address for the interactive map display system, in a manner as will be familiar to those of ordinary skill in the art accessing internet sites.

The interactive map system may display any suitable combination of map configuration and data points that are capable of being displayed on the user's display screen. In an embodiment, the interactive map 200 image displayed on the screen may be digitally represented using a plurality of map tiles, where each tile fills a section of a grid, with multiple grid sections combined in a grid pattern to form the display. The interactive map display system is able to utilize any suitable source of map tiles used in conjunction with the invention and could function with multiple types of map tiles, including but not limited to vector tiles, raster tiles which are available through a host of service providers, as one of ordinary skill in the art of software engineering would understand.

Figure 7:
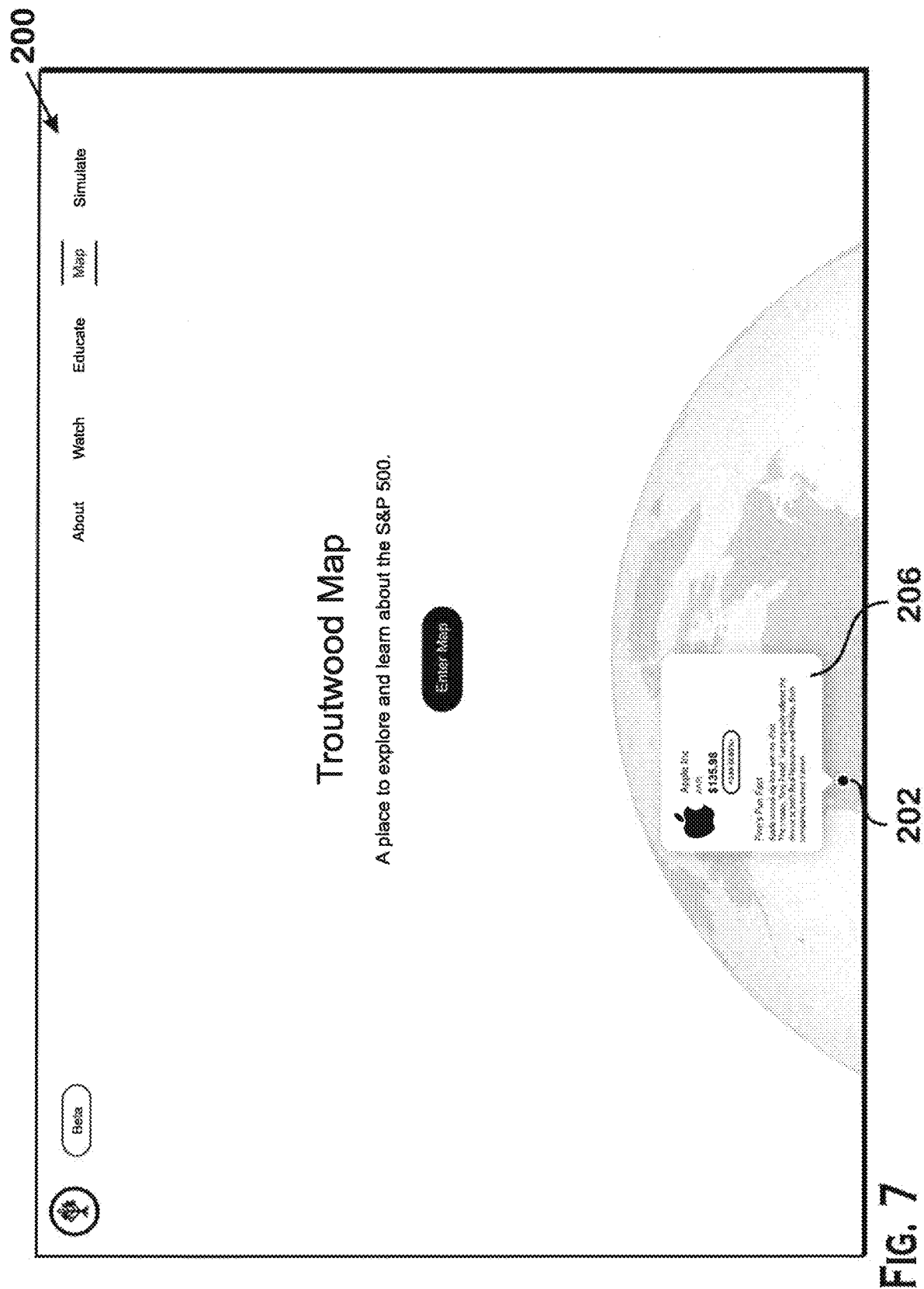
FIG. 7 is a screen shot of the user interface for an interactive map display system according to the invention showing a representative landing screen as rendered on a display of a computing device.

As the user accesses the interactive map display web site, the screen display is caused to display a landing screen, for example, as depicted in FIG. 7, that presents the user with a default view predetermined by the interactive map 200 administrator. Alternatively, the landing screen may be a saved view, such as where the user has previously accessed the system. In an embodiment where the landing screen is a default view, there may be displayed data or data categories relevant to the nature of the icons being displayed. For example, the landing screen default view may provide data or data categories relevant to companies (e.g. U.S. publicly traded companies) and may include financial information. Alternatively, the landing screen may provide data or data categories relevant to sports teams or sports leagues (e.g. NFL, NBA, MLB, NHL, Division I collegiate football teams, etc.). The data or data categories displayed may be predetermined by the interactive map 200 administrator via the administrator portal controlling the interactive map 200.

In an embodiment, where the landing screen is a saved view, the landing screen may include content that was custom selected or created by the user during a previous authenticated user session with the interactive map system, and may display data or data categories which the user selected and saved to their profile preferences. In such an embodiment, the user may create a custom "watchlist" of categories or data to be displayed, to create a user-defined view. For example, where the user is viewing stock market related entries and statistics, the user may select to have the saved view display a group of companies, markets, or sectors from which to depict company statistics. Alternatively, where the user is viewing sports related information, the landing screen may display a user selected group of teams, players, conferences or leagues, and related data on the interactive map 200 display. In any event, the saved view for the landing screen may be recalled via the user's authenticated account credentials upon accessing the interactive map 200 application.

For preparing the interactive map 200 display, the data to be displayed is obtained via a backend server, either a physical server or virtual server, containing a database. The database for the backend server may be populated either automatically, or via API calls to the appropriate data provider for the nature of the information sought. Such data providers would be known to those of skill in the art. An API call to the data provider would return the most recent information sought, which may be near real time, or as updated by the data provider, whether daily, hourly, or other increment of time as determined by the data provider. Alternatively, the database may be populated manually. In still another embodiment, the database may be populated using a combination of automated and manual processes, for example manually triggering software to access the updated information, for example, provided as a text string, and a computer program may then transpose or transform the data as needed for preparing the interactive map 200 display. One skilled in the art of software engineering may envision alternative methodologies that fall within the spirit of the teachings herein.

The user through a computing device may then access the interactive map 200 information, as the computing device 10 can electronically communicate using the network 9, with the web server 5 and application server 4. Once the user has the interactive map 200 displayed on the user's screen, the user will then have access to a displayed control interface, which may be a graphical user interface (GUI), allowing the user to interact with the program. Through the displayed control interface the user can cause the display to be altered to provide different information, or adjust the interactive map 200 display. As noted previously, interaction by the user with the displayed control interface may be through the use of finger or stylus gestures to navigate the general user interface (GUI) provided on the screen by the software. However, one skilled in the art should appreciate that other implements could be used; including a computer mouse, a keyboard, or joystick. Through interactions with the interface, the user may perform at least the following actions and/or selections.

Cursor and/or Touch Interaction with Objects Displayed on the Interactive Map 200

In an exemplary embodiment, objects or icons depicted on the interactive map 200 display could be visual markers, such as the primary icon elements 202a with multiple data properties that are selectable for display by the user. The icons may be any suitable marker, and can be considered a digital "push pin". In an embodiment, the primary icon element represents the geographic coordinates of an object, building, entity, which may be determined by the nature of the interactive map 200 information being presented. For purposes of this example, the icon will be discussed as representing the location of a publicly-traded company's headquarters, though one skilled in the art would recognize that the icon may alternatively represent other items, persons, teams, facilities, entities, or things, and varied as appropriate for the nature of the interactive map 200 information to be displayed.

The primary icon element 202a may be color coded, and/or be provided with an indicator or marking (e.g. symbol, logo, graphic) on the depicted icon 202, that serves to indicate additional information about the icon. For example, the primary icon element 202a may be marked to indicate the market sector and/or industry in which the company is categorized, and may match a list of provided key elements 282 on a key panel 280.

The icon 202 displayed on the interactive map 200 may have a primary icon element 202a as the center point, and an associated secondary icon element 202b to provide a visual indicator regarding a data point or trend associated with that primary icon element 202a. Such a secondary icon element 202b may be a visual element, such as a circular "bubble" indicating data value, which may be either an absolute data value or a relative data value. For example, where the primary icon element 202a is representing a company, the secondary icon element 202b may provide an indicator of that company's Market Capitalization, 1-Day Price Change %, for example etc. An exemplary list of data metrics that may be associated with the secondary icon elements 202b are provided in Table 1. These metrics are non-limiting examples, and one skilled in the art that the teachings herein may be adapted to display alternative metrics, and still fall within the spirit of the invention.

In an embodiment, where the secondary icon element 202b is a bubble, for example, as depicted in FIG. 8, the size of the secondary icon element 202b, e.g., the "bubble" or similar visual display element, shown here surrounding the primary icon element 202a, e.g., the object push pin or marker, could be determined by an algorithm defining a maximum allowable number of pixels in a dimension of the secondary icon element 202b, e.g, the partial radius, or partial diameter, and then rendering the corresponding data value associated with each object relative to that maximum value within the set. In this manner, the absolute value determines the size of the secondary icon element around the primary icon element. As depicted in FIG. 8, determining the radius or diameter of the secondary icon element 202b would be determined from the center point of the primary icon element 202a, thus the secondary icon element 202b would be the partial radius or diameter, being the portion of the radius or diameter after subtracting out the portion for the primary icon element 202a as it would be of a fixed size.

Alternatively, the size of the "bubble" or similar visual display element surrounding the primary icon element 202a, in the form of the object push pin or marker could be determined by an algorithm that defines the maximum allowable number of pixels, radius, diameter, area, etc. based on the data value of the largest outlier value within the overall set of data for objects rendered on the interactive map 200 display interface. Thus the sizes of the secondary icon element 202b is adjusted according to a relative scale in proportion to the determined values of the other secondary icon element 202b on the display.

In an exemplary embodiment, the moving and/or placing of the cursor over an object displayed on the interactive map 200, an action referred to in this application as "hovering", the user may thus cause a "hover window" display to appear near the object and the hover window may display additional relevant data associated with the object, for example, in an additional information panel 206 as depicted in FIGS. 10-15, and 17.

In an exemplary embodiment, the "hover window" data displayed could be stock price, price change expressed in currency terms, price change expressed in percentage terms, text description about the object company such as a summary of the business, a "fun fact" about the company, etc.

In an exemplary embodiment, while the user is hovering the cursor over an object on the interactive map 200, as described in the preceding, the user may then "click" on an object displayed on the interactive map 200. By this action a user may cause a new window, e.g., an additional information panel 206, to appear within the interactive map 200 interface and that window may contain its own control interface or "dashboard" with which the user may take further interactions. Such a window may be persistent, in that it does not automatically close if the cursor is moved away from the icon.

In an exemplary embodiment, this window could be a company dashboard or company profile which displays text and graphic information of a nature descriptive of, or related to, the company represented by the interactive map 200 object push pin or company marker.

This dashboard may include any number of interactive user selectable buttons 314 which the user select and cause the system to render different data within the dashboard interface. For instance, in one exemplary embodiment, the dashboard could include a button labeled "Stats" which, if clicked by the user, would cause financial statistics related to the selected icon 202 object company to be called from the database/server and then displayed within the dashboard window.

In another exemplary embodiment, the dashboard could include a button labeled "News" which, if clicked by the user, would cause related news stories linked to the company's name or ticker symbol to be called from the database/server and then be displayed within the dashboard window in the additional information panel 206.

Cursor and/or Touch Interaction with the Interactive Map 200 "Key" which Indicates Categories of Objects In an exemplary embodiment, the user may cause the cursor to interact with the key element 282 within the key panel 280, where each of the key elements are uniquely represented, whether by having a distinct color code and/or icons specific to the object categories. In an exemplary embodiment, the user may interact with each map key element 282 by clicking the key element, and toggling on/off the display of icons 202 that fall into the selected categorized groups of objects. The key panel 280 thus functions as both an information guide to help the user identify which objects displayed on the interactive map 200 belong to a similar data category (e.g. by industry sector, such as Technology Companies) and also functions as an interface which enables the user to filter which groups of data are displayed. For example, if the user does not want to view companies in the Energy sector, the user may simply click the Energy sector key element 282 in the key panel 280, thereby causing all icons 202 on the display that fall into the selected category to be removed from the interactive map 200 or otherwise hidden from view on the interactive map 200 display.

Cursor and/or Touch Interaction with a "Tray" Control Interface Located on One or More Edges of the Display Screen In an exemplary embodiment, the tray control interface includes buttons which the user may activate by cursor, finger, etc. to access additional functions such as: search panel, secondary icon element control, and stock screener/filter.

As depicted in FIG. 12, there is provided a search module 270 having a search panel 310. The search panel enables the user to enter the name of a company, ticker symbol, etc. within a text entry panel 312 to search the data set available via the backend server. As the text is entered, the search module will search within the information within the system, e.g., the map database, and/or the third party API, with the search looking to match the entered text string, and provides the search results in the search panel 310 below the text entry panel 312.

The user may then review, scrolling if necessary through the list, and can then click on any of the search result items, which will center the interactive map 200 on the geographic location of the selected result and/or call up display of the corresponding dashboard for the specific selected result.

As depicted in FIG. 9, the user may access a menu option panel 290, by which the user may customize the display. As shown, the user may modify the bubble metric control interface, of the menu panel 290, thereby altering the data utilized for preparing the secondary icon element 202b on the display screen 11. As shown in FIG. 10, as an alternative method, the current bubble metric for the secondary icon element 202b is % price change, by selecting the arrow adjacent to the "% price change", the screen may display a list of alternative data series which may be utilized for preparation of the secondary icon elements 202b.

In an exemplary embodiment, the menu panel 290 contains a clickable icon for the bubble metric control interface which enables the user to view and select various categories of data which exist in the backend server for the interactive map 200 and which may be displayed on the interactive map 200 as visualized data bubbles of one or more of size, scale, and/or color corresponding to either the absolute data value or to the data value relative to the overall data set, or to a limited data set of only the icons 202 displayed on the screen.

For example, the user may select a data category titled "Fundamentals" and a specific data set within "Fundamentals" called "Revenue". When the user takes these actions, the interactive map 200 renders a visual representation of the data in the form of circular "bubbles" as the secondary icon elements 202b surrounding the primary icon elements 202a, serving as object markers displayed on the interactive map 200. It is contemplated that the bubble size (the dimensions of the displayed secondary icon element 202b) would then correspond to the "Revenue" data value for each primary icon element 202a associated with a company, based on the data housed within the backend server.

In an exemplary embodiment, the user may filter the icons represented on the map display, whereby the system may function as a Stock Screener for the user. In an exemplary embodiment, the user is able to access a stock screener via a tray in the menu panel 290. Similar to prior examples of stock screeners, the user is able to filter or otherwise narrow the entire dataset available through the backend server down to only data meeting the user selected screening criteria.

Example: The user checks a box labeled "Market Capitalization" and then is prompted to enter a minimum and maximum "Market Capitalization" parameter for data they wish to view. The user enters a minimum value of $1 trillion and a maximum value of $2 trillion. This selection will then cause the system to narrow the dataset from thousands of companies down to only a handful of companies that can be displayed in their geographic location on the map. The screener results may include companies headquartered in the United States and listed on U.S. stock exchanges and, further may, as an alternative, or in addition, include companies that are outside of the U.S. and listed on non-US exclusive stock markets, for example, Saudi Aramco, based in Saudi Arabia. The user then adds an additional screening parameter selecting Index Membership and checking a box for S&P 500. Because Saudi Aramco is not part of the S&P 500, it is now removed and the screen results are further narrowed.

Although numerous examples of stock screeners exist in prior art, the invention is novel because it is the first screener to render screening results of financial company information on a geographic map.

In the foregoing specification, the invention has been described with reference to specific embodiments thereof. It will be evident, however, that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions, including the ability for the user to personalize. Additionally, and obviously, features may be added or subtracted as desired. Accordingly, the invention is not to be restricted except in light of the attached claims and their equivalents.

What is claimed is:

1. An interactive map display system comprising:
   a computing device having a display screen including a graphical user interface;
   a processor connected to the display screen that is programmed with executable instructions including:
      accessing one or more databases and transmitting data indicative of a single entity among a plurality of entities the data including both static information comprising location and categorial data about the single entity and dynamic information about the single entity comprising one or more varying aspects associated with a primary icon element, the processor including programmatic instructions to frequently connect to a database and refresh the dynamic information; and
   one or more of a web application server and a database server connected to the processor, the server including a plurality of modules stored in a server memory, including:
   a map display module connected to the graphical user interface via the processor;
   an icon display module connected to the map display module containing programmatic instructions to display a plurality of icons representing a plurality of entities of a common grouping and positioned within an interactive map on the display screen, each icon of the plurality of icons is indicative of a single entity of the plurality of entities and includes:
      a primary icon element illustrative of the static information which includes location and categorial data about the single entity; and
      a secondary icon element illustrative of the dynamic information through a visual depiction of changing data values relating to the single entity, the secondary icon element conveys both a magnitude of change and a direction of change of a data value associated with the single entity, wherein the direction of change relating to the single entity is either non-negative, or negative; and a selection module configured to transmit data to a web browser upon initialization via a user trigger, whereby the display screen presents a user with a plurality of icons and the system provides the user an ability to select one of the plurality of icons using a user selectable button.

2. The interactive map display system of claim 1, wherein the common grouping is a class, league, division, market, business sector or team.

3. The interactive map display system of claim 2, wherein the primary icon element includes an identifier name displayed on the interactive map.

4. The interactive map display system of claim 3, wherein the primary icon element includes a marking to indicate a sector of the common grouping.

5. The interactive map display system of claim 4, further comprising a key panel for interpreting the marking by color or shape.

6. The interactive map display system of claim 4, wherein the secondary icon element includes a visualization metric representing frequently updated data of changing values and changing on a periodic basis.

7. The interactive map display system of claim 6, wherein the secondary icon element includes a bubble data visualization positioned around the primary icon element.

8. The interactive map display system of claim 6, wherein the secondary icon element providing a visualization metric based on data values associated with a user selected parameter.

9. The interactive map display system of claim 8, wherein the visualization metric is bubble metric representing a changing financial data.

10. The interactive map display system of claim 9, wherein the icon display module varies a size of the secondary icon element based on comparative data value of the plurality of entities.

11. The interactive map display system of claim 4, wherein the secondary icon element is a disk surrounding the primary icon element and provides an indication of the direction and magnitude of change of the data value associated with the primary icon element.

12. The interactive map display system of claim 11, wherein a size of the disk of the secondary icon element indicates the magnitude of change and a color indicates the direction of the change.

13. The interactive map display system of claim 1, further comprising a search module providing a search panel for entry of a search string and displaying a list of results.

14. The interactive map display system of claim 1, further comprising a zoom module providing adjustment of a map scale and adjustment to a center of the interactive map.

15. The interactive map display system of claim 1, wherein the icon display module further displays a plurality of ancillary icons unrelated to the plurality of primary icons and secondary icons.

* * * * *